April 4, 1950 G. G. KEYES 2,502,654
SELECTIVE SIGNALING SYSTEM AND APPARATUS
Filed Nov. 15, 1947 10 Sheets-Sheet 1

INVENTOR
GEORGE G. KEYES
BY Emery Robinson
ATTORNEY

April 4, 1950 G. G. KEYES 2,502,654
SELECTIVE SIGNALING SYSTEM AND APPARATUS
Filed Nov. 15, 1947 10 Sheets-Sheet 3

INVENTOR
GEORGE G. KEYES
BY Emery Robinson
ATTORNEY

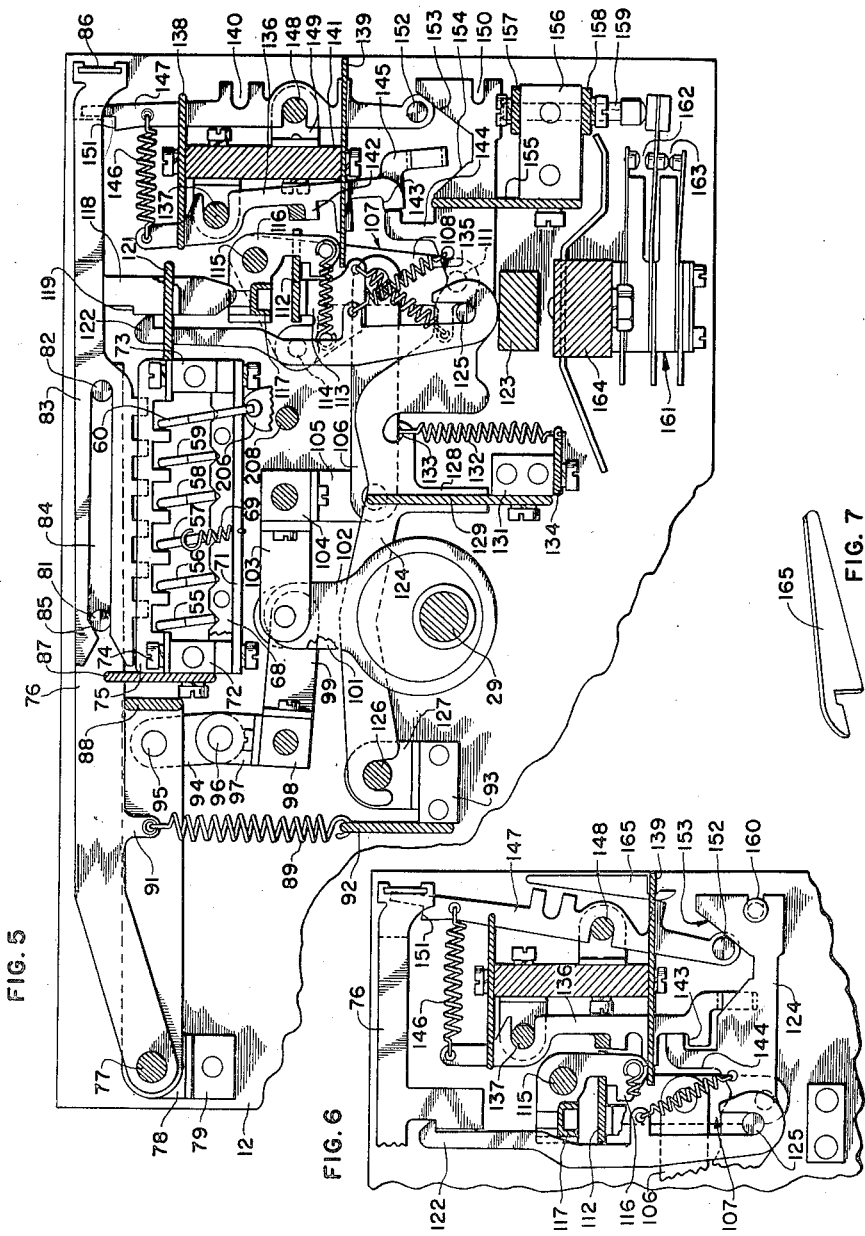

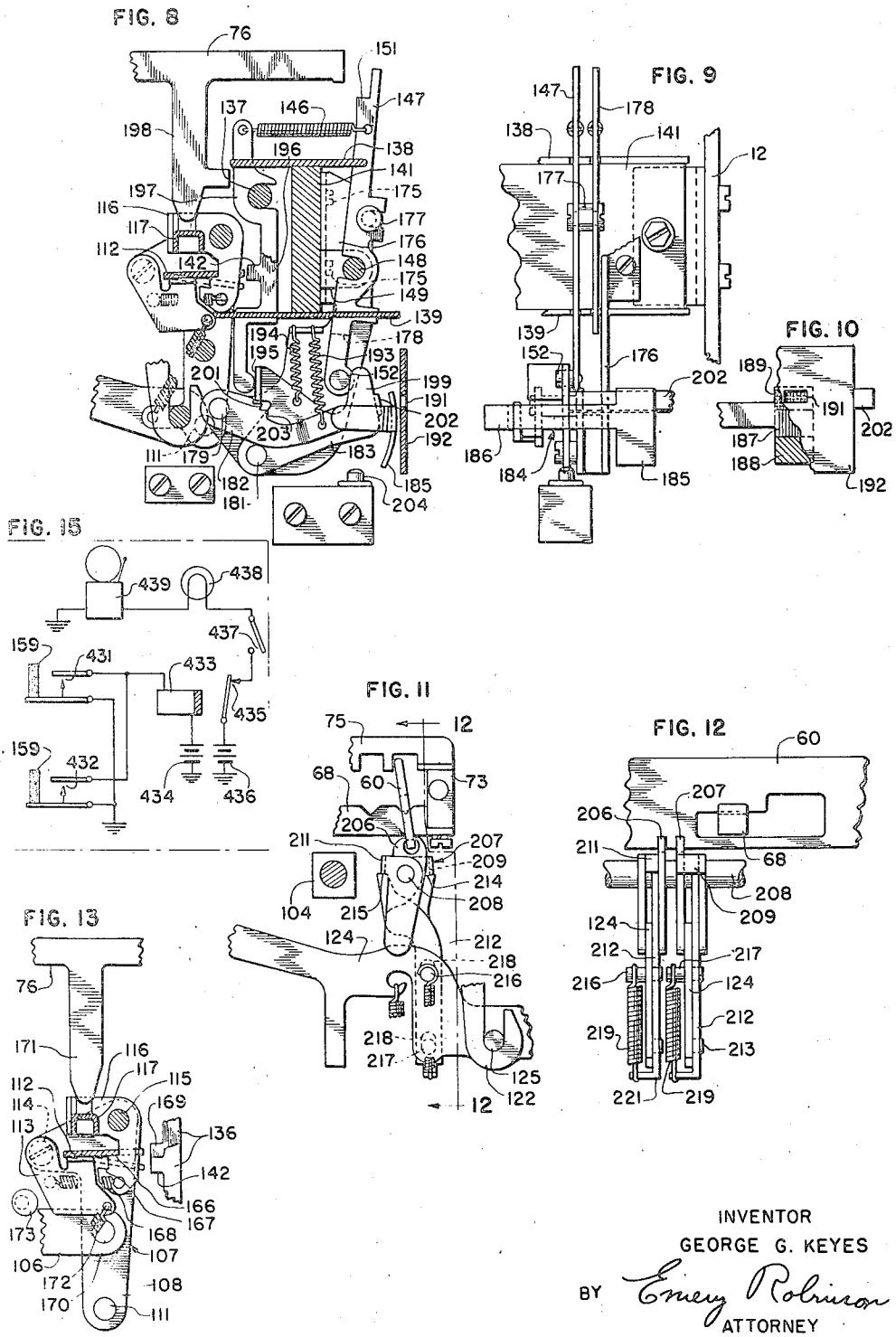

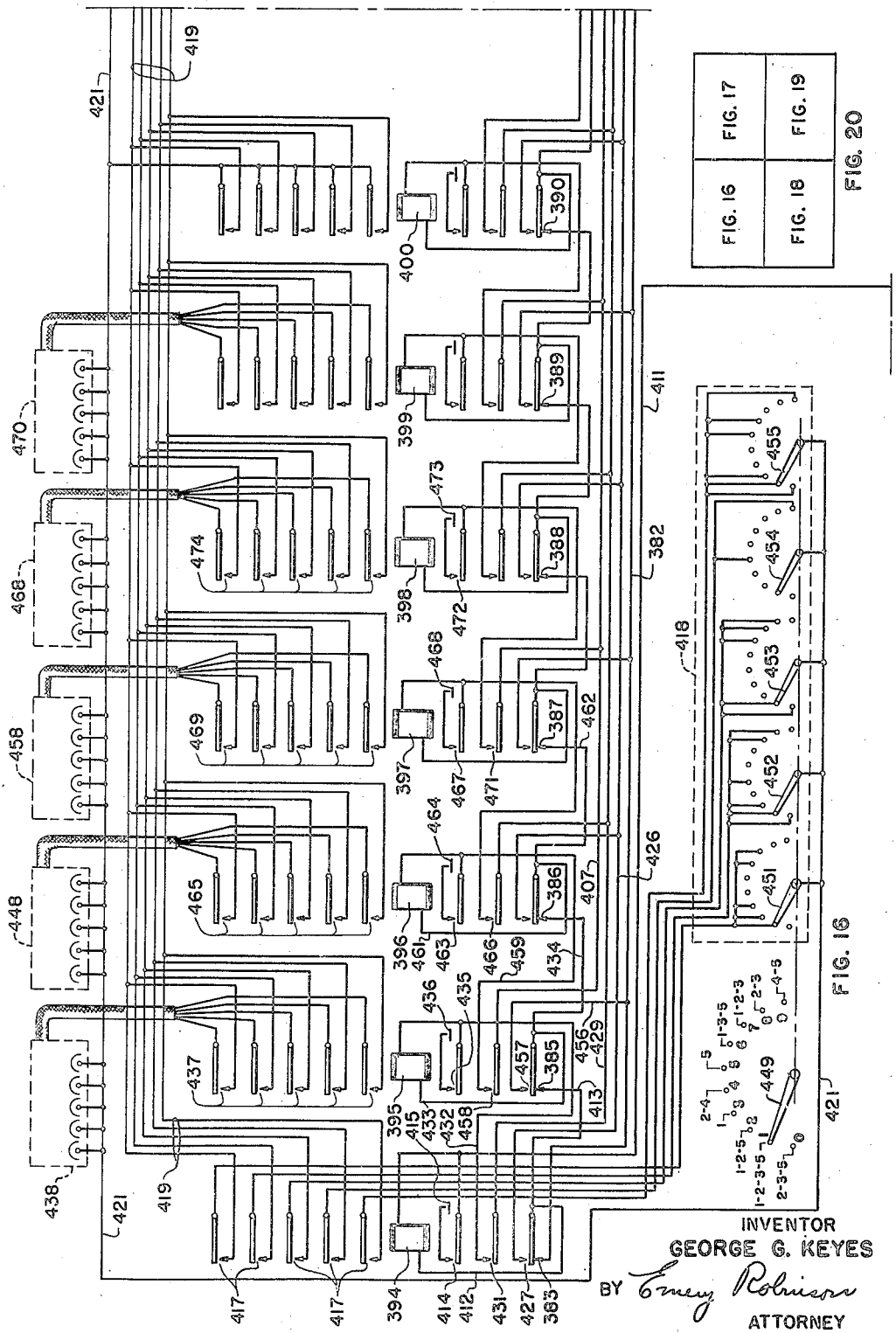

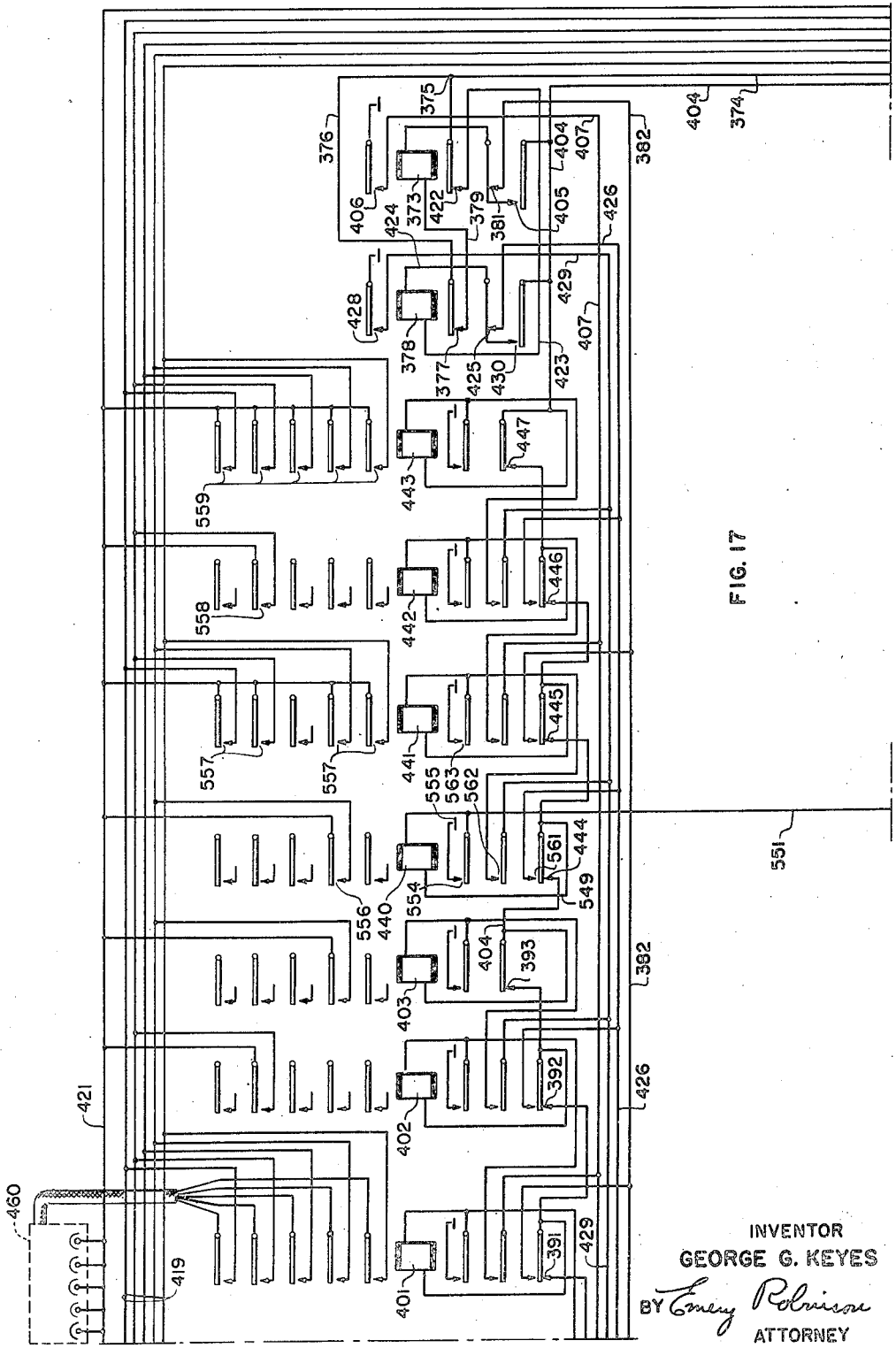

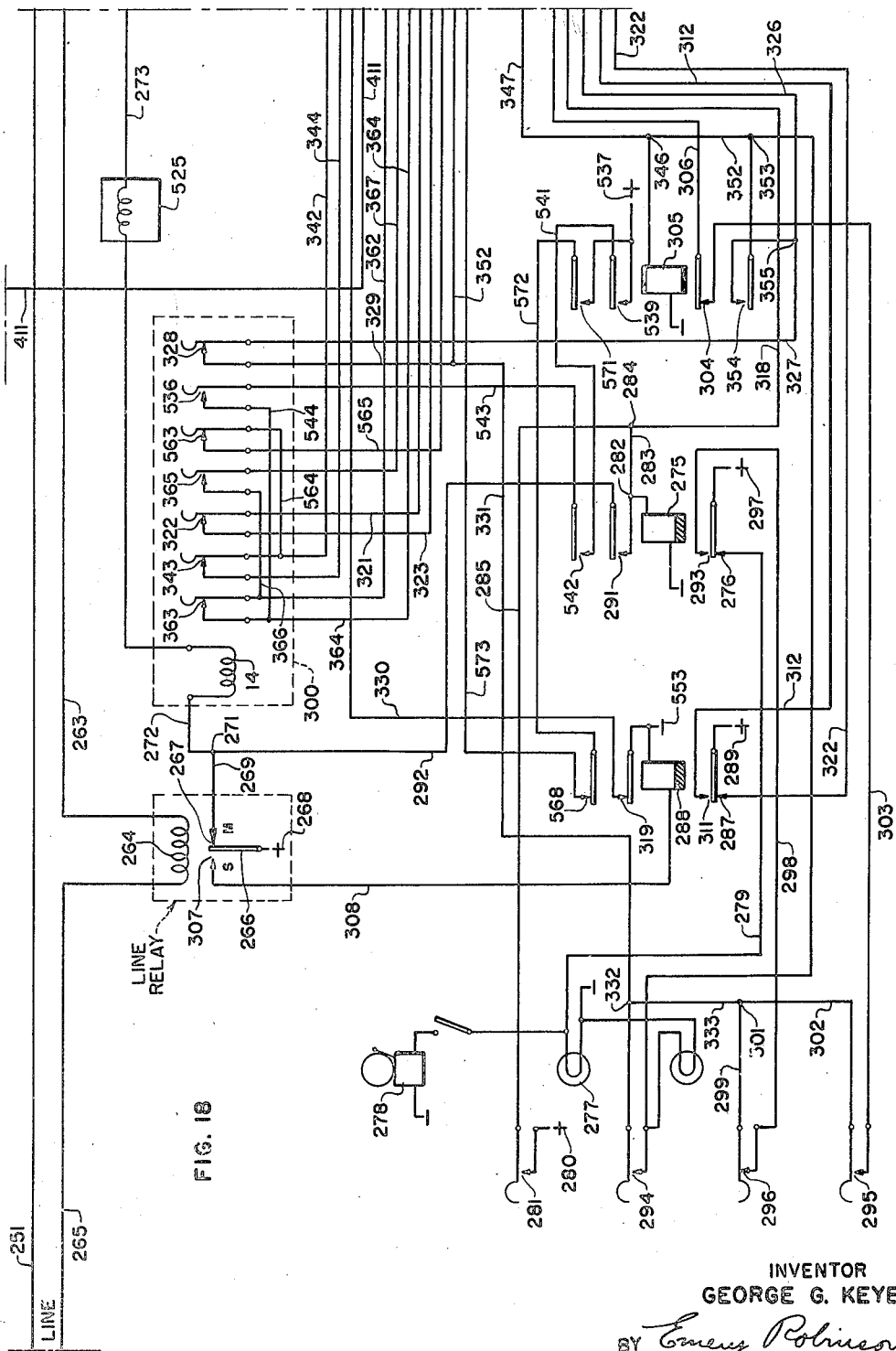

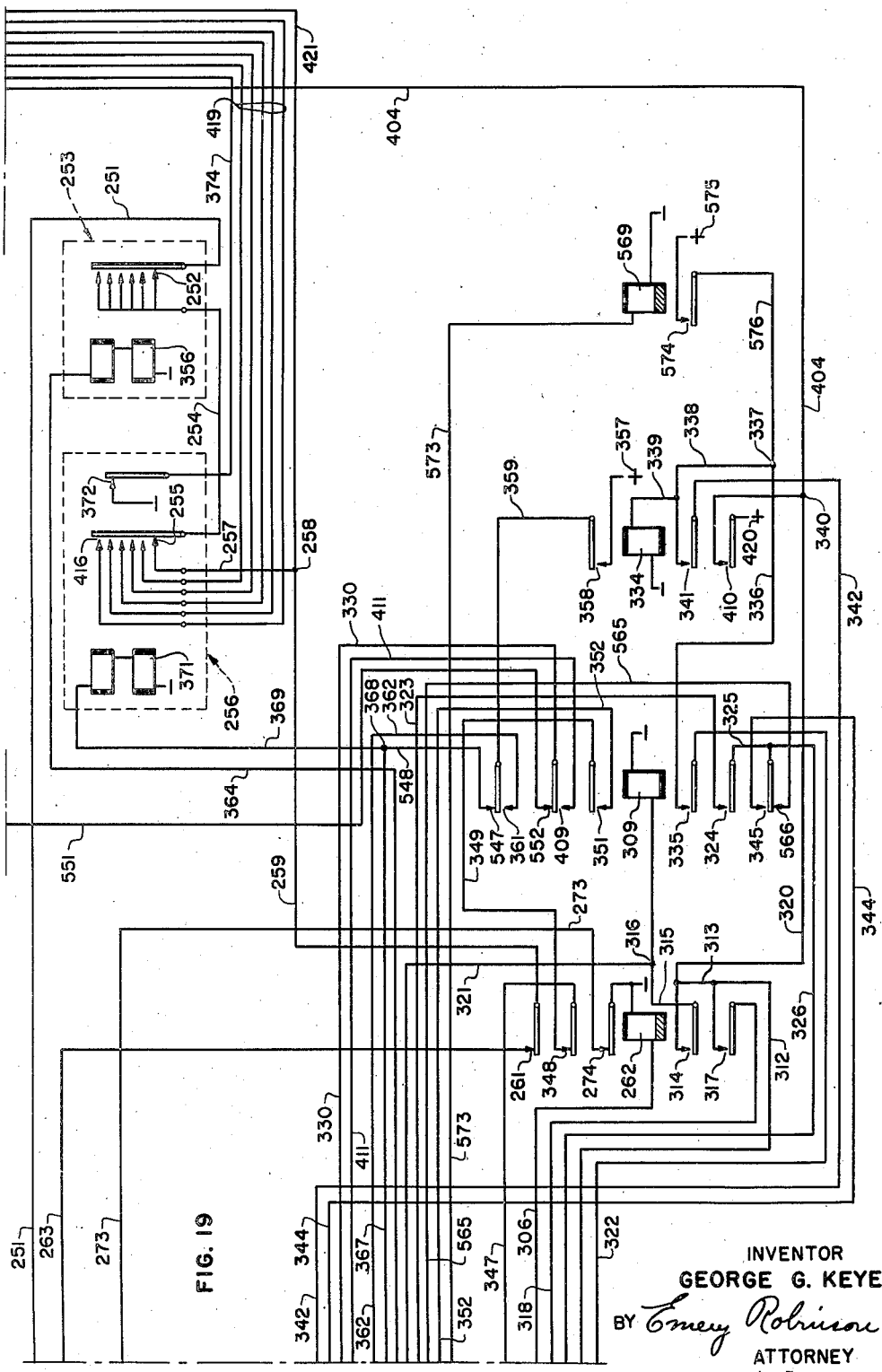

April 4, 1950 G. G. KEYES 2,502,654
SELECTIVE SIGNALING SYSTEM AND APPARATUS
Filed Nov. 15, 1947 10 Sheets-Sheet 10
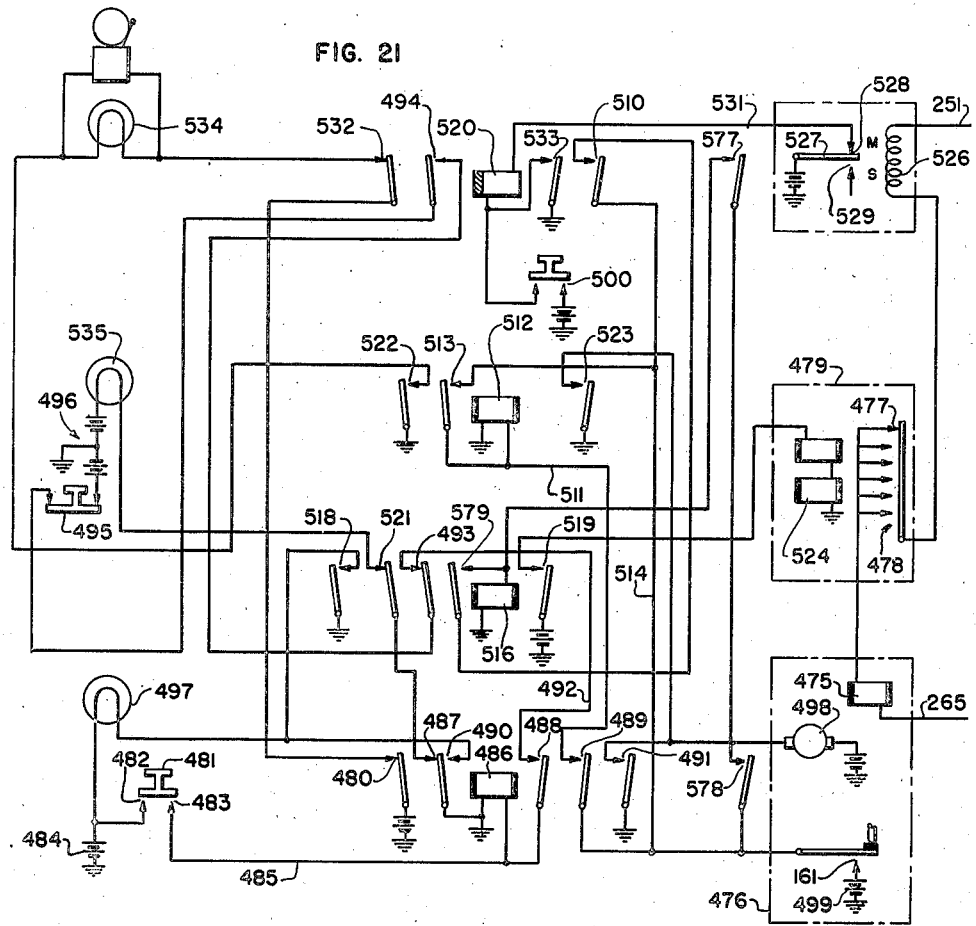
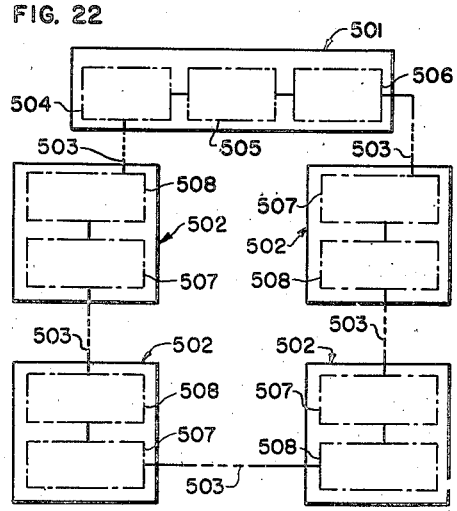
INVENTOR
GEORGE G. KEYES
BY Emery Robinson
ATTORNEY Patented Apr. 4, 1950

2,502,654

UNITED STATES PATENT OFFICE 2,502,654

SELECTIVE SIGNALING SYSTEM AND APPARATUS

George G. Keyes, Chicago, Ill., assignor to Teletype Corporation, Chicago, Ill., a corporation of Delaware Application November 15, 1947, Serial No. 786,171

7 Claims. (Cl. 178—2)

The present invention pertains to printing telegraph systems and more particularly to transmission control systems.

It is the primary object of the invention to provide in an arrangement which is entirely automatic when initiated into operation upon the actuation of a single key for collecting previously prepared information a means for automatically inserting time indicating codes.

Another object of the invention is the provision of a transmission control system having instrumentalities associated with a centrally located station for seizing control of the line circuit, thereafter controlling the order in which a series of stations connected thereto is caused to transmit previously prepared messages to such centrally located stations and automatically inserting time indicating code signals.

Specifically, the present invention provides automatic selective transmission control for use in connection with preliminary collection of weather information over a telegraph communication system. Control of this system is provided by primary sequential control equipment located at the primary switching center or master control station on the loop circuit. The system according to the present invention utilizes selector equipment at each way station, which is always connected to the line and surveys the information passing over the line.

A sequence collection transmission on this system starts with the transmission from the primary of central station of a predetermined sequence of characters which includes one or more letter station identification for the first way station from which transmission is desired. At this point transmission from the primary or central station equipment ceases and the secondary or way station equipment, recognizing the condition code, identification letters codes of its station, and the lock codes starts transmission of the message (for example, weather information) waiting in the form of previously prepared perforated tape. At the conclusion of this message, end of message signals in the message tape are transmitted to shut down transmission from the way station and activate the final or central station equipment to transmit the station identification letters of the next desired way station to be called in. The sequence of transmission of station identification letters at the primary station is contained in a continuous loop of perforated tape. The loop of tape need be changed only when a rearrangement of the order in which station transmission occurs is desired.

In the system according to the present invention, it is contemplated that weather information shall be collected hourly, at which times transmission of such information, which has been previously prepared on perforated tape from each station will occur automatically under the control of the master control station in predetermined order in response to the operation of a switch at the master control station. However, a prerequisite to automatic operation under the control of the primary or master control station is the act of the way station to place the equipment thereat in automatic condition, which condition is established by the insertion of the tape, and operation of a key indicative of automatic operation, thus making the way station receptive to control by the master control station. Pursuant to the operation of said switch, the entire sequence selection will take place automatically. As a preliminary to transmission, the primary or master control station equipment opens the line for a predetermined interval to stop any transmitter distributor which may be operating on the circuit. Following this, a sequence collection switch is operated and a so-called sequence collection heading is transmitted from the control tape in the primary (or central station) transmitter distributor. This heading comprises a group of signal codes, which precedes each hourly weather sequence collection, which information is included in the aforementioned continuous loop of tape; for example, "letters" code, station identification (call letters of the central or master control station), carriage return code, a plurality of line feed signals, A and W character codes (signifying airway weather), space signal, shift signal, "circuit of origin" number, space, shift signal, "date-time" group codes, "letters," "carriage return," and "line feed." The foregoing codes control the page printer in the following manner: The "letters" code places the printer in condition to print lower case characters. The station identification letters are then printed on the page, and the carriage return signal returns the carriage to the beginning of the line position. A plurality of line feed signals provide a space between the station heading and the first line of printing. The first characters, for example, are AW meaning airway weather. Then the circuit of origin number is printed, followed by the date and time and zone when the weather information is taken, after which the printer is positioned in the unshift position, the carriage is returned to the beginning of line position and the paper is spaced to present the next line of printing preparatory to receiving the weather reports from the several way stations. Then the proper condition, select and lock codes of the first way station are transmitted, after which the primary station transmitter distributor stops. The equipment at the selected way station responds to these codes and starts transmission of the data contained in the perforated tape at the way station (for example, the weather information).

At the end of the data (for weather information) transmission, an unlock code is transmitted by the way station. This code stops the transmitter distributor at the outlying or way station and is recognized by the primary or master control unit and its associated relay bank for the purpose of starting the transmission of the actuating codes for the next way station to be called in.

Reference is made to copending application Serial No. 599,322 filed June 14, 1945, by W. J. Zenner, which discloses related subject matter. Said copending application covers a transmission control system wherein a centrally located station not only controls the order in which a series of stations connected thereto are caused to transmit previously prepared messages to said centrally located station, but also automatically inserts predetermined missing code groups indicative of message termination. The arrangement according to the present invention differs from said disclosure in that special facilities are provided for automatically inserting time indicating code signals indicative of the date and time.

A better understanding of the invention may be had from the following description taken in conjunction with the accompanying drawings, wherein:

Figs. 3 and 3A are views showing the main shaft clutch mechanism;

Fig. 5 is a cross sectional view taken substantially on line 5—5 of Fig. 1;

Fig. 6 is a fragmental cross sectional view showing the corresponding portion of Fig. 5 in an operated position;

Fig. 7 is a perspective view of the gate;

Figs. 8, 9, and 10 are fragmental sectional views and front elevation, respectively, showing features of the pivoted bail and the signal testing device;

Figs. 11 and 12 are fragmental views illustrating the sixth vane control mechanism;

Fig. 13 is a detail view of the pivoted bail member;

Fig. 14 is a view of an alternate form of latch lever releasing means;

Fig. 15 is a circuit diagram of an alternate form of signal testing device;

Figs. 16, 17, 18, and 19 are circuit diagrams comprising the electrical operating circuit at the central or master station;

Fig. 20 is a view showing the manner of matching the Figs. 16, 17, 18, and 19;

Fig. 21 is an electrical circuit for the way station; and

Fig. 22 is a diagram of the loop circuit embodying the arrangement according to the present invention.

Figure 1:
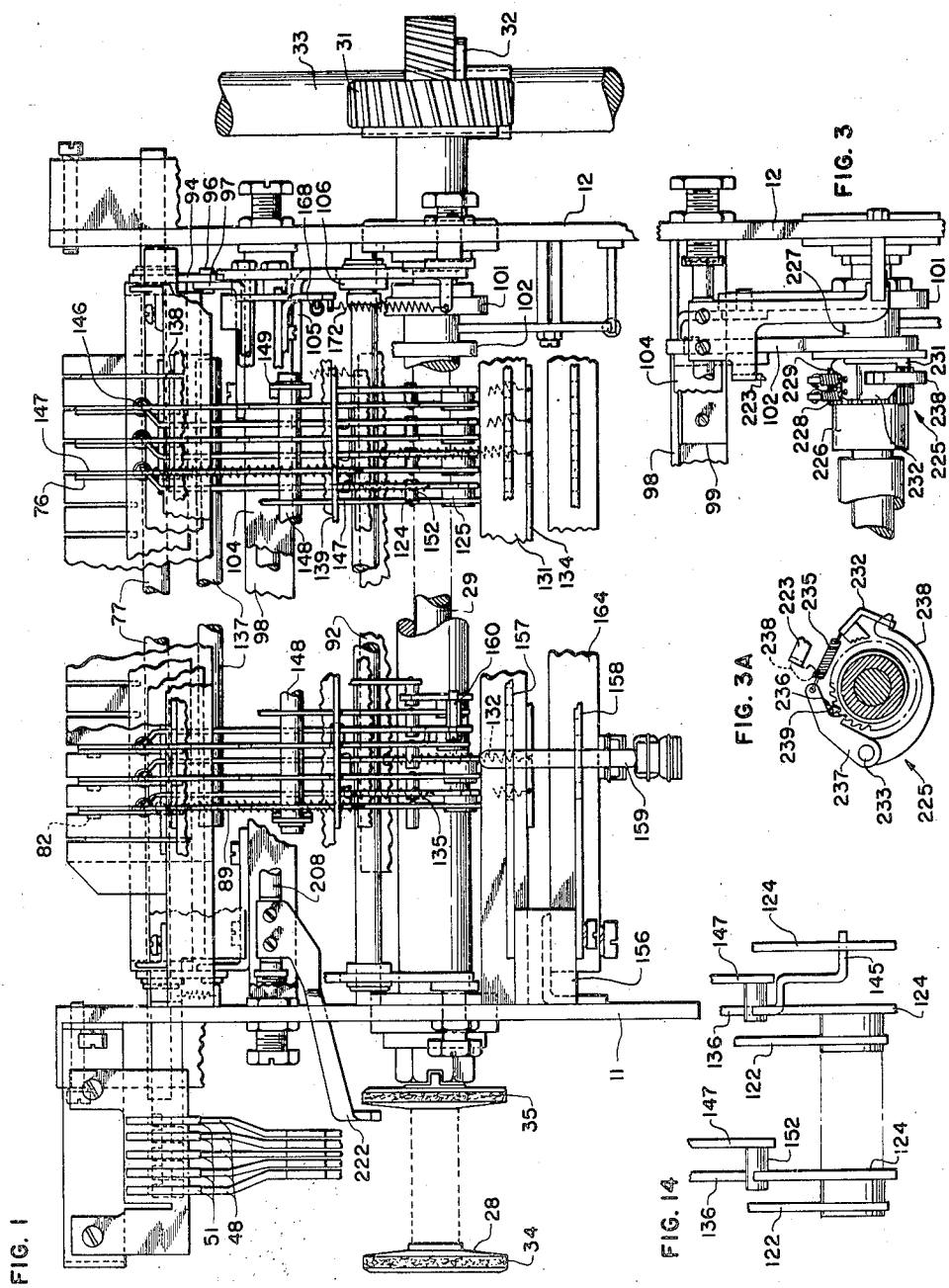
Fig. 1 is a front elevational view of the control unit.
Figure 2:
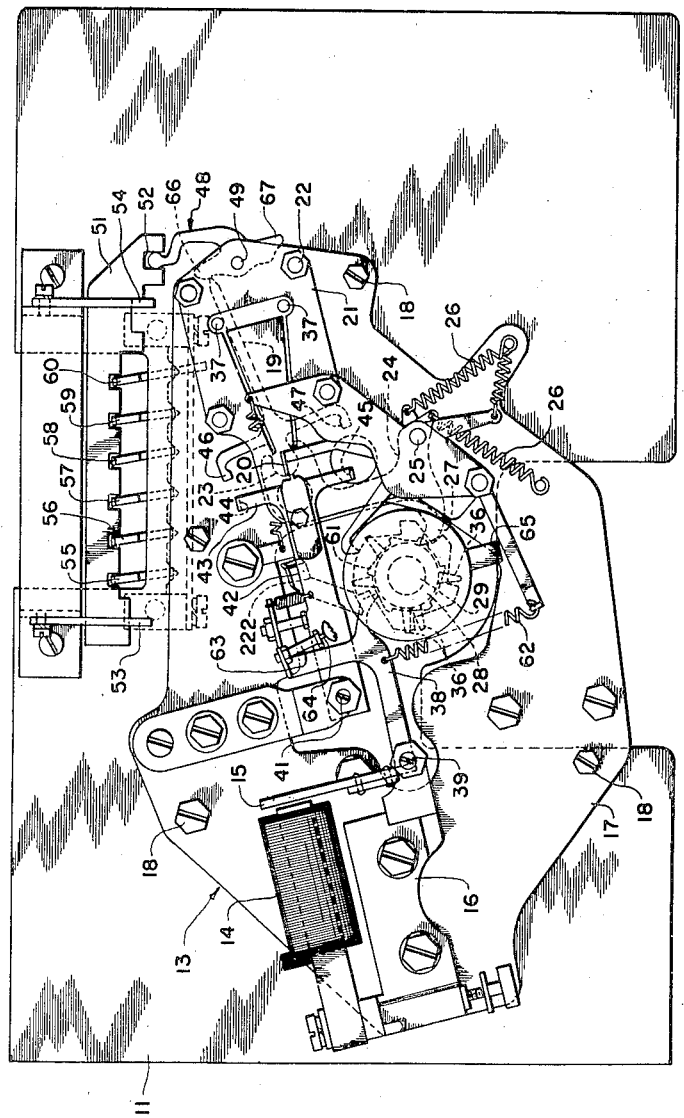
Fig. 2 is a side elevational view of the control unit showing the selector mechanism.
Figure 4:
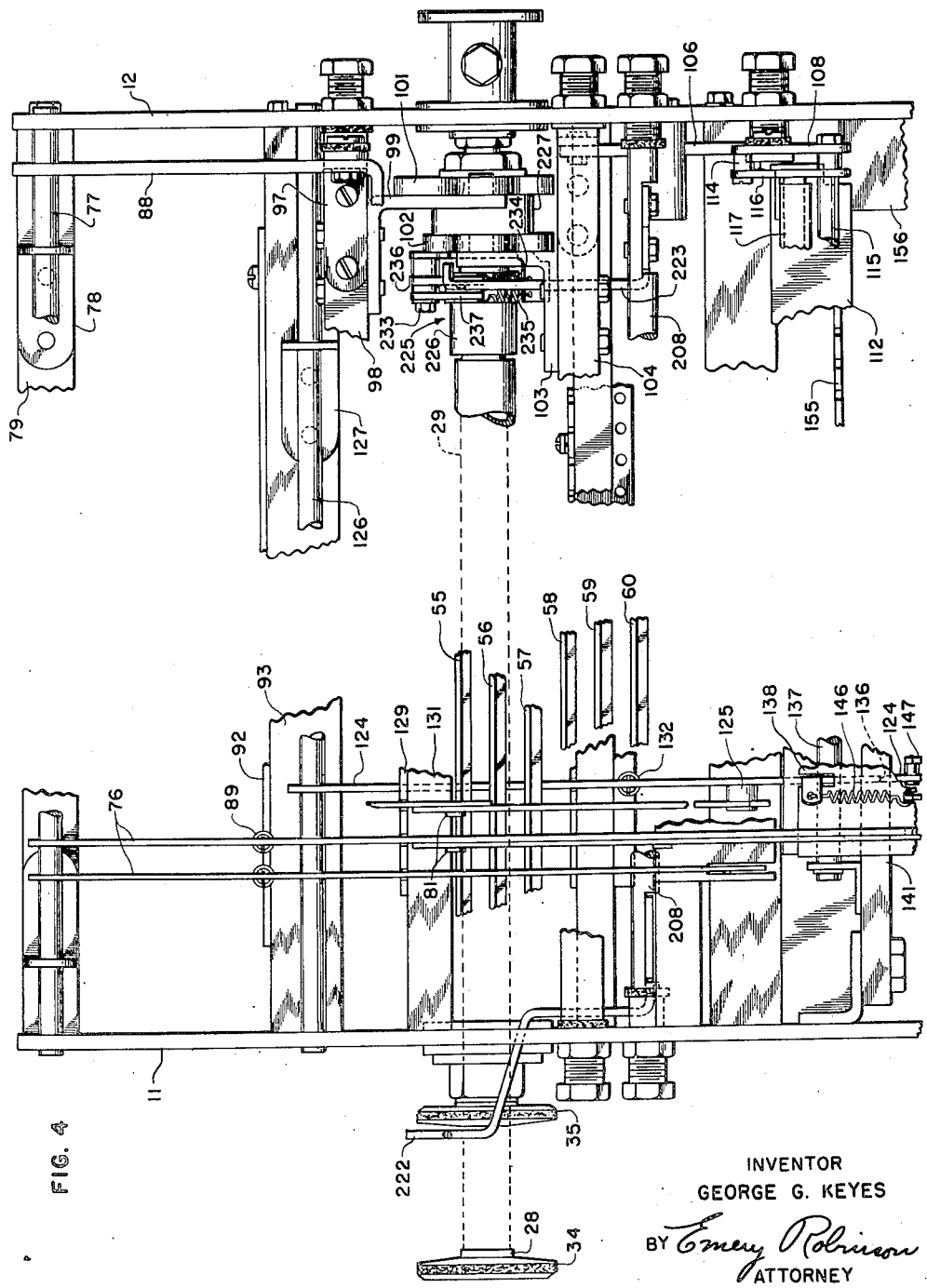
Fig. 4 is a top view of the control unit.

Having reference to the drawings, the control unit according to the invention comprises a structure which is composed of side plates 11 and 12, and a plurality of crossbars, hereinafter specifically referred to, which are secured to the side plates to form a rigid framework for the arrangement of the mechanism for achieving the various objects and functions of the invention. Referring to Fig. 2, there is mounted on the outside of side plate 11 of the aforesaid structure (also shown on the left side of the apparatus, as viewed in Fig. 1) is a selector mechanism, generally indicated as 13, which is responsive to received code combinations of signaling impulses. The selector mechanism 13 is of the type shown in United States Patent No. 1,745,633 granted February 4, 1930, to S. Morton et al., and comprises a selector magnet 14 which is connected in the line circuit and controls an armature 15. Magnet 14 is supported on a bracket 16 carried on a selector mounting plate 17. Plate 17 is held in spaced relation with side plates 11 by suitable spacing elements 18.

The selector mechanism 13 comprises a set of five selector elements in the form of thin, flat fingers 19 arranged in substantial overlapping relation between suitable guide plates 21. These plates 21 are mounted on studs 22 and spaced by washers (not shown). The circular rear ends 20 of the fingers or swords 19 engage corresponding sockets 23 in a corresponding series of thin flat bell cranks 24 pivoted on a common shaft 25. Individual springs 26 normally hold the bell cranks and selector swords into the position shown in Fig. 2 with the pointed rear end 27 of the bell cranks 24 in contact with a cam barrel 28 on shaft 29 which is driven continuously through interconnecting gears 31 and 32 and cross shaft 33 by a properly regulated motor (not shown), the driving connection between the shaft 29 and the cam barrel 28 being established through friction clutches 34 and 35 (Fig. 1).

The cam barrel 28 is provided with a helically arranged series of cams 36, one for each of the bell cranks 24, which rotates the bell cranks 24 (five in the present instance) in succession and thus reciprocates longitudinally the succession of selector swords 19 as the cam barrel 28 is rotated. In addition to the longitudinal movement, the selector swords 19 have a lateral pivoting movement between a pair of stops 37.

The setting of any selector sword 19 either to its right-hand or to its left-hand position is determined by the selector magnet 14. The magnet armature 15 is fixed to a flutter lever 38 which is pivoted on a stud shaft 39 carried in the mounting plate 17. Mounted on a pivot shaft 41 adjustably positioned and adjacent to, and in cooperative relation with the flutter lever 38 is a selector lever 42. Lever 42 terminates at its free end in a U-shaped portion 43 having downwardly extending arms 44 and 45 which constitute abutments which cooperate with arms 46 and 47 on the rear end of selector swords 19 and act to position the latter in either a right-hand or left-hand position. The several swords 19 act through a corresponding number of rocker levers 48, arranged between the guide plates 21 and pivotally mounted on a stud shaft 49, to position a set of notched members 51. Levers 48 are pivotally articulated to the bar 51 through means comprising the ball-shaped ends of the levers 48 cooperating with notches 52 in the permutation bars 51.

The permutation bars 51 are slidably carried in a pair of comb guide bars 53 and 54 extending from and attached to side plate 11. Each of the permutation bars 51 is provided with a notch which engages operatively the end of a vane member 55 to 60, inclusive.

The springs 26 associated with the bell cranks 24 normally hold the selector swords 19 in their forward position and in engagement with the rocker levers 48, and each permutation bar 51 thus is held in either one or the other of its two positions according to the position of the associated selector sword 19 against one or the other of its stops 37.

As the signal impulses are received, the selector magnet 14 which is connected either directly in the line or through a line relay responds only to one of the two different electrical conditions comprising the signals and seizes its armature 15 when a marking impulse is received, and releases it when a spacing signal is received, while the selector fingers or swords 19 are reciprocated successively in synchronism with the signal by the cams 36 of the spiral series of cams on the cam barrel 28. The arms 46 and 47 are thereby brought into cooperative relation with the abutments 44 and 45 at the corresponding signal intervals, thereupon setting the selector fingers or swords 19 in their variant combinations. In practical operation, however, in order to insure the alignment of abutments 44 and 45 and arms 46 and 47 in their respective cooperative positions, limiting stops may be provided for the member 42 analogous to stops 37 for the swords 19. The particular selector mechanism shown in Fig. 1 is of the assisted armature type shown in United States Patent No. 1,937,376, issued to W. J. Zenner, wherein the armature 15 is assisted to the poles of the magnet 14 by the action of a star wheel cam 61 upon the lever arm 38, and the selector lever 42 is resiliently connected to the lever arm 38.

As previously mentioned, the normal condition of the line is marking, and hence the line magnet 14 is normally energized. During the first line impulse or start interval which is of spacing nature, the electromagnet 14 is de-energized, and the movement of the armature lever 15 which will be actuated by its spring 62 will cause the set screw 63 to shift the plunger 64 to initiate operation or rotation of the selector cam barrel, as clearly described in the afore-mentioned patent to Zenner. The cycle of operation of the cam barrel 28 thus is initiated. Stop arm 65 is thus released and the cam barrel 28 is permitted to rotate one cycle, which cycle is terminated in a well-known manner by the reception of a stop impulse.

Thus, as the cam barrel 28 is rotated, the cams 36 act to actuate the bell crank lever 24 counterclockwise (as viewed in Fig. 2) to reciprocate the swords 19, thereby bringing the arm 46 or 47 into contact with abutments 44 or 45 depending upon whether the selector magnet 14 has responded to a marking or a spacing condition. Then, the levers 24 are actuated clockwise to bring the swords 19 into contact with one or the other arms 66 or 67 of the rocker lever 48. The rocker levers 48 then actuate the permutation bars 51 rightwardly or leftwardly (as viewed in Fig. 2) according to whether a marking signal or a spacing signal has been received. As previously mentioned, each of the bars 51 is notched to engage a single vane 55 to 59, inclusive, so that as the bars 51 are selected or actuated permutatively the respective vanes 55 to 59 will be rocked correspondingly.

The vanes 55 to 59 rest in V-shaped grooves or notches formed in a pair of supporting bars 68 (Fig. 5) one in proximity to each of the side plates 11 and 12 and are adapted to rock about the V-shaped grooves as fulcrums. As shown in Fig. 5, the vanes are biased to their clockwise or counterclockwise position by an overcentering spring 69 (only one such spring being shown in Fig. 5 for the sake of clarity) extending from the upper half of the vane (the lower half being cut away) to a spring bar 71 connected to cross bars 72 and 73 extending between and connected to the side plates 11 and 12. Mounted on the cross bars 72 and 73 by means of screws 74 is a plate 75, the bottom edge of which is notched to provide limiting stops for the vanes 55 to 59 so that their extreme clockwise and counterclockwise movements may be definitely determined.

Arranged transversely above the vanes 55 to 59 are a plurality of selectable bars 76 which are pivoted at the rear of the structure (to the left as viewed in Fig. 5) on a pivot shaft 77 carried on brackets 78 mounted on a cross bar 79 extending between and connected to the side plates 11 and 12. The selectable bars 76 are provided with a pair of studs 81 and 82 which are adapted to be engageable by a code element 83, one such element being associated with a selectable bar 76. The code elements 83 are provided with deep open ended slots 84, and the free ends of the tines being beveled to permit ready application of the code element 83 over the studs 81 and 82. The upper tine is provided with a cam bevel 85 which serves to impart pressure upon the stud 81 to maintain the code element 83 securely in place. The code elements 83 are provided on their bottom edges adjacent the vanes 55 to 59 with wards and notches permutatively arranged according to the symbols or characters the particular selectable bar represents. The code elements 83 are each provided at the right-hand extremity, as shown in Fig. 5, with a means for receiving the insignia plate 86.

The series of selectable bars 76 are guided vertically in a comb bar 87 and are adapted to rest upon a bail 88 which is pivotally mounted on the shaft 77. Individual springs 89 act to bias each of the selectable bars against the bail 88, the springs extending from projections 91 on the selectable bars 76 to a spring bar 92 fixed to a cross bar 93 extending between and connected to the side plates 11 and 12. When the selectable bars 76 rest normally upon the bail 88 the wards and notches of the code elements 83 are held away from the vanes 55 to 59.

The operating means for bail 88 comprises a link 94 pivotally connected at 95 to the bail 88, the other end of the link 94 being connected at 96 to a bracket 97 carried on a rock shaft 98 journaled in the side plates 11 and 12. Also secured to the rock shaft 98 is a bracket 99 the outward end of which is pivotally connected to an eccentric 101 mounted operatively on the main shaft 29. Thus, as the shaft 29 rotates, the eccentric 101 will, through bracket 99, cause the rock shaft 98 to rock and thus, through a toggle action between the bracket 97 and link 94 the bail 88 will be oscillated.

Also carried on the main operating shaft 29 is an eccentric 102 which is connected to a bracket 103 carried on a second rock shaft 104 journaled in the side plates 11 and 12. Rock shaft 104 is provided with a depending bracket 105 which is pivotally connected to a link 106, the other end of the link 106 being pivotally connected to a bail, generally indicated as 107.

Bail 107 comprises a pair of side members 108 and 109 which are pivotally supported on individual studs 111 secured to the side plates 11 and 12. Thus, when the main shaft 29 is rotated, the eccentric 102 is reciprocated vertically to impart, through arm 103, a rocking motion to rocker shaft 104, which through link 106 oscillates bail 107 backwardly and forwardly (the right-hand side of the structure shown in Fig. 2 being considered the front thereof). Bail 107 also includes a bail blade 112 which is mounted on a pair of supports 113 pivotally carried on each of the side members 108 and 109 by means of pivots 114.

Carried on pivots 115 on each of the side members 108 and 109 are a pair of latches 116 which are united by an inverted U-shaped bar 117 spaced above and substantially parallel to the bail blade 112. Then, when the bail 107 is operated, elements 112, 113, and 116 also move with it. The action of the latch 116 and pivoted support of blade 112 will appear hereinafter.

Each of the selectable bars 76 is provided with a depending portion 118 having a shoulder 119. Portions 118 are guided in a comb bar 121 and certain of the bars 76 are provided with a longer depending portion 118 for cooperating with the bar 117 in a manner to be described presently. Cooperating with the shoulder 119 of bars 76 are a corresponding series of pull bars 122 adapted to rest on a cross bar 123 extending between and united to side plates 11 and 12. Pull bars 122 are pivotally articulated to a corresponding series of levers 124 through individual pivot studs 125 carried on said levers 124. Levers 124 are pivotally mounted on a pivot shaft 126 carried in a pair of brackets 127 mounted on the cross bar 93. Levers 124 are provided with depending arms 128 through which said levers 124 are guided in a comb bar 129 secured to a cross bar 131 extending between and connected to the side plates 11 and 12. Each of the bars 124 is normally biased downwardly by an individual spring 132 distended between a hook 133 on the bar 124 and a spring bar 134 carried on the bottom of the cross bar 131. Thus, by means of springs 132 the bars 124 are normally adapted to rest upon the cross bar 123. A spring 135 extends between bar 124 and the pull bar 122 and normally acts to bias the pull bar 122 in a clockwise direction about the stud 125. The pull bars 122 are normally guided in the guide comb 121.

As will presently appear, the code bars 76 upon selection will, through their shoulders 119, engage the pull bars 122, whereupon the bail 88 will lift the code bar and the engaged pull bar to thereby pivot the bar 124 associated with the operated pull bar 122 about its pivot 126 against the action of its individual spring 132. Associated with each bar 124 is a latch member 136, which is one of a series of latch levers pivotally carried on a pivot rod 137 journaled in the side plates 11 and 12. The latch levers 136 are guided in an upper comb 138 and a lower comb bar 139 secured to a cross bar 141 which extends between and is connected to the side plates 11 and 12. The latch levers 136 are provided with projections 142 individual thereto, which are of variable widths to cooperate with the bail blade 112 when it is desired to release shoulder 143 of the latch lever 136 from the hook portion 144 integral with the bar 124. Certain of the latch levers 136 are provided with a lower extending end 145 the purpose of which will hereinafter appear.

A spring 146 connects the upper end of a latch lever with an associated blocking lever 147. The series of blocking levers 147 corresponds to the series of latch levers 136 and is carried pivotally upon a pivot rod 148 journaled in the bracket 149 mounted on the cross bar 141. The blocking levers 147 are also guided in the combs 138 and 139.

Each blocking lever 147 is provided adjacent its upper end with a shoulder 151 which in the vertical position of bar 147, as shown in Fig. 5, acts to block or prevent the selection of an associated code bar 76. To enable the selection of a code bar 76 the blocking lever 147 associated therewith is swung clockwise about its pivot 148 by the co-action of stud 152, carried at the lower extremity of lever 147, and cam surface 153 on lever 124. The extension 145 when present on a latch lever 136, cooperates with a cam surface 154 on the lever 124. Levers 124 are guided near their forward end by a guide comb bar 155 secured to a block 156 secured to side plates 11 and 12.

Secured to the upper and lower surfaces of blocks 156 are a pair of bars 157 and 158 which serve as guides for plungers or interponents 159 positioned beneath the outer or forward extremities of levers 124. Each plunger 159 serves to operate a contact assembly 161 associated therewith. Contact assemblies 161 each comprise a pair of contacts 162 and 163, and are secured to a cross bar 164 extending between and connected to the side plates 11 and 12.

In Fig. 6 is shown the respective levers and bars in one of their operated positions. The lever 76 is shown in its upward position after having been selected and reciprocated vertically to engage the pull bar 122. The pull bar 122 through the stud 125 has raised the lever 124 upwardly so that the cam surface 153 of the lever 124 has cooperated with the stud 152 of the blocking lever 147 to swing or rotate the blocking lever 147 clockwise upon its pivot shaft 148, thus tensioning the spring 146. The lever 124 has been raised so that its hook portion 144 is in latching engagement with the shoulder 143 of the latch lever 136. The levers 136 and 124 remain in latching engagement through the action of spring 146.

Since all of the blocking levers normally assume their vertical position, as shown in Fig. 5, the shoulders 151 of the blocking levers 147 are all in a position to block the rotative or selective movement of their respective bars 76, thus precluding the possibility of effecting a selection. Thus it becomes necessary in order to initiate the sequential selection of the bars 147 in accordance with the code designation of the particular station at which the unit is located to manually actuate one of the blocking levers 147 to its clockwise position enabling the selection of the first of the series of bars 76 and to remove the shoulder 151 from the path of the bar 76. Therefore, an instrumentality herein identified as a gate 165, shown in Fig. 6 and also shown in detail in Fig. 7, is provided, to be inserted in a slot in the guide bar 139 in front of its respective blocking lever so that the blocking lever 147 is actuated to its clockwise position to move the shoulder 151 out of cooperative relation with the front of the bar 76.

In Fig. 13 is shown a detailed view of the bail member 107, previously mentioned as comprising side members 108 and 109 (only side member 108 is shown in Fig. 12), bail blade 112, supports 113, latches 116, and bar 117. As previously described, bail 107 is pivotally carried on studs 111 and is oscillated by the link 106 attached at 170 to the side member 108. As mentioned hereinbefore, the bail blade 112 is carried on a pair of supports 113 each of which is pivoted on studs 114 secured to the side frames 108 and 109. Bail blade 112 is suitably notched to cooperate with a pair of latches 116 each provided with a pair of stepped shoulders 166 and 167. A support 113 and a latch 116 comprise a pair of elements which are attrahently biased by a spring 168 extending therebetween.

Bail blade 112 is adapted to normally engage the shoulder or step 166 of latch 116 to hold said bail in operative relation with lugs 169 of certain latching levers 136. Upon the selective operation of certain selectable lever members 76, the depending arm of 171 thereof, which is longer than the arms 118 at the normal levers 76, will co-act with the inverted U-shaped bar 117 (which is attached to the latches 116) to actuate latches 116 counterclockwise against the pull of spring 168 to disengage shoulder 166 from bail blade 112, and permit the supports 113, carrying bail blade 112, to respond to the pull of a spring 172 (which is slightly stronger than spring 168) to bring the edge thereof into engagement with the shoulder 167. The bail blade 112 thus is brought into operative relation with the lug 142 of the bars 147 when the bail 107 is rotated or rocked in a rightward direction. When the bail 107 is rocked in a counterclockwise or leftward direction the supports 113 strike individual eccentric stud members 173 which are so adjusted that the movement of the bail 107 causes the supports 113 to be rocked counterclockwise to engage the blade 112 on shoulder 166. Thus, upon each oscillation of bail 107, the eccentric stud members 173 undertake to return the bail 112 to its position in engagement with shoulder 166 so that when the bail has been disengaged from the shoulder 166, through the selection of predetermined ones of levers 76, and engaged by shoulder 167, the ensuing counterclockwise movement of bail 107 will cause the supports 113 to strike the stud 173, thereby camming supports 113 counterclockwise on its pivot 114 to effect the re-engagement of blade 112 with shoulder 166.

In Figs. 8, 9, and 10 are shown details of the signal testing device, according to the present invention. Having reference to Fig. 8, there is secured to the cross bar 141 by means of screws 175 a bracket 176 for supporting the mechanism for the signal test feature of the invention. The common shaft 148 for the blocking levers 147 is mounted on the end brackets 149 secured to the cross bar 141, as previously described. The bracket 176 for supporting the signal testing mechanism is located just beyond and to the rear (as viewed in Fig. 8) of the bracket 149. The blocking lever 147, shown in Fig. 8, is particularly assigned to the RY combination (for example, the letter of characters R and Y). This blocking lever 147 is connected by a bridge 177 to an adjacent blocking lever 178 which has its lower portion removed or cut off.

Bracket 176 is provided with a pair of pivot studs 179 and 181 on which are pivotally supported lever arms 182 and 183, respectively. Lever arm 182 is provided at its free end with plate 184 having a target 185 and finger piece 186. The target 185 is provided with three colored areas; namely, a red area 187, a green area 188, and a white area 189 viewable through an aperture 191 in the front plate 192. Lever arms 182 and 183 are normally biased counterclockwise about their pivots by individual springs 193 and 194, respectively, extending between said lever arms and a laterally directed flange on the bracket 176.

Lever arm 183 is provided with a laterally directed flange 195 which cooperates with a pair of levers 196 and 197 of similar design mounted on the latch lever shaft 137. Each of the levers 196 and 197 are provided with springs 146 extending between these levers 196 and 197 and of blocking levers 147, the same as previously described in connection with the latch levers 146. The levers 76 assigned to the R and Y characters are each provided with a depending portion 198 comparable to portion 118 of the other levers except that these depending portions 198 are not provided with any latch shoulders. Lever arm 183 is provided with the finger piece 202, as previously mentioned, so that the lever 183 can be manually actuated or rotated around its pivot 181. Lever 183 is provided with a projection 199 which cooperates with a stud 152 on the associated blocking lever 147 so that when the lever 183 is actuated upwardly or counterclockwise the projection 199 cams the stud 152 leftwardly to rotate the blocking lever 147 clockwise about its pivot shaft 148 to bring the shoulder 151 of the blocking lever out of alignment or register with the forward end of the selectable lever 76.

As the lever 147 is thus rotated, the special lever 178 is also rotated therewith due to the interconnection therebetween by the bridge member 177. Then, upon the receipt of the R and Y signals, the levers 76 corresponding to the R and Y code combination will be selectably operated so that the depending projections 198 thereon will operate the latch 116 through the U-shaped bar 117. Thus, upon receipt of the R and Y signals, the bail 112 will be actuated from its solid line position to the dotted line position shown in Fig. 8 whereat it is no longer in alignment with the lug or projection 142 on the levers 196. Therefore, the bail 112 has no effect upon the RY test mechanism. However, if a mis-selection should occur or a character should be received other than the R or Y signals, the bail 112 will not be released and in its oscillating movement the bail blade 112 will co-act with the lug 142 to move or rotate the lever 196 counterclockwise about its pivot shaft 137 so that its lower end will strike the flange 195 of the lever 183 to cause the lever 183 to be rotated clockwise against the action of its spring 194 to bring the lateral flange 195 into engagement with the next shoulder or step 201 on the lever 182. Due to this action lever 182 is permitted to rock or move counterclockwise by its spring 193 to bring the red area 187 into register with the aperture 191 to impart an appropriate signal to the operator. Furthermore, the lever 183 in rotating clockwise will permit the lever 147 to be rotated counterclockwise by its spring 146 to bring the shoulder 151 into vertical alignment with the end of the selectable bar 76 thus preventing further selection of the bars 76 of the R and Y signals.

The RY test is therefore completed and may be reset for further RY tests by manipulating the handle extension 202 of the lever 183 to rotate the lever 183 counterclockwise thus bringing the lever 183 into the position shown in Fig. 8 whereat the flange 195 is again in engagement with the top shoulder or step. The RY test mechanism may be again brought into condition for RY test by manipulating the handle 186 of the lever 182 so as to rotate the lever 182 downwardly or clockwise thus bringing the laterally disposed flange 195 of lever 183 into engagement with the top shoulder of the lever 182 as shown in Fig. 8. Should it be desired to disable the RY test mechanism temporarily, the handle 202 extending from the lever 183 is manipulated to rotate the lever 183 clockwise, as viewed in Fig. 8, to bring the flange 195 into engagement with the shoulder 203 of the lever 182 whereat the lever 183 is locked or detained against the action of its spring 194, and the blocking levers 147 and 178 retain their vertical position with the shoulders 151 in vertical alignment with the ends of the selectable bars 76. During the RY test, and upon receipt of a mis-selection, the lever 183 is actuated clockwise to strike and operate a plunger 204 which may either control a contact to illuminate a lamp or to ring a bell, in a well known manner.

An alternate form of signal (or R-Y) testing device is shown in Fig. 15, which is electrical rather than mechanical. A contact 431 (similar to contact 162) is associated with the R selector lever (of the series of levers 76) exemplified by plunger 159 associated therewith, and contact 432 is likewise associated with the Y selector lever. Contacts 431 and 432 are connected in parallel with a slow-to-release relay 433, so that the energizing circuit for relay 433 is completed from battery 434, through the winding of relay 433, and through either contact 431 or 432 to ground. Relay 433 controls a contact 435 which is included in a circuit extending from grounded battery 436, through contact 435, through manually operated switch 437, through lamp 438, and through alarm bell 439 to ground.

In the operation of the alternate form of signal testing device, the switch 437 (which is normally maintained open) is closed, and the R and Y test signals are received, the effect of which is to close contacts 431 and 432 alternately. The closing of either contact 431 or 432 will complete a circuit for energizing the relay 433. The armature of relay 433 will be attracted to open contact 435. Now, so long as contact 435 is maintained open, the alarms 438 and 439 are not operating, indicating that the sequence of R and Y characters are correctly received, the slow-to-release relay 433 remaining energized so long as impulses are received from contacts 431 and 432. However, if one or more characters R and Y are omitted (or other characters are interpolated) the slow-to-release relay 433 will de-energize causing contact 435 to close to give the alarm.

In Figs. 11 and 12 are illustrated the mechanism for controlling the sixth vane 60. The vane 60 is not controlled by a lever 48 (Fig. 2) but is independently controlled in response to code signal combinations instead of a signal impulse. However, in the event a six unit code is used, vane 60 will respond to a signal impulse in the same manner as vanes 55 to 59. Associated with the vane 60 are a pair of jaw-like structures or members 206 and 207 pivotally carried on a shaft 208 extending between the side frames 11 and 12. Members 206 and 207 are provided with diametrically opposite, laterally disposed portions 209 and 211 which cooperate with members 212 and 213 having abutments 214 and 215. Members 212 and 213 are each provided with studs or pins 216 and 217 which cooperate with slots 218 in the lever 124. The pins 216 and 217 are normally held at the bottom of the slots 218 by individual springs 219 extending between the pins 216 and a laterally directed portion 221 on the members 212 and 213.

Upon the receipt of a shift or unshift code signal the corresponding selectable bar 76 is actuated which through a pull bar 122 causes the associated lever 124 to be actuated upwardly (or counterclockwise as viewed in Fig. 5). This action of lever 124 imparts through springs 219 vertical movement to its associated member 212 or 213 to bring the abutments 214 and 215 against the portions 209 and 211, respectively. In the event the abutment 215 strikes the portion 211 the member 206 is rotated clockwise to swing the vane 60 into the position shown in Fig. 11. On the other hand, in the event that the abutment 214 strikes the portion 209 of the member 207, the member 207 is rotated counterclockwise to impart reverse rotation to the vane 60 to swing it to the position opposite to that shown in Fig. 11.

In the general operation of the apparatus shown in Figs. 1 to 7, the code combinations of signaling impulses are received by the selector magnet 14 (Fig. 2) and are effective through the armature lever 15 and the flutter lever 38 in cooperation with the flutter cam on the cam assembly 28 to actuate the selector lever 42. Upon receipt of the start impulse which is of spacing nature the magnet 14 is de-energized and the selector lever 42 is actuated to operate the plunger 64, which has been explained in the afore-mentioned patent to initiate rotation of the cam assembly 28. During the rotation of the cam assembly 28 the cam lugs thereon sequentially actuate the rocking levers 24 which in turn actuate the swords 19, which in cooperation with the abutments on the selector lever 42 operates the T-lever 48 to actuate the selector bars 51 rightwardly or leftwardly in accordance with the signaling impulse conditions. As is explained in the afore-mentioned patent, the cam projection on the cam sleeve 28 which is known as the clutch trip off cam operates a clutch trip off lever 222 (shown in Figs. 1 and 4). Lever 222 is conformed to extend through the side plate 11 and to be secured to a shaft 208 journaled in the side plates 11 and 12. At the opposite end of shaft 208 near side plate member 12 is secured a clutch release lever 223.

The main shaft clutch (Figs. 3, 3A, and 4), indicated generally as 225, is associated with a sleeve 226 fixed to the main shaft 29, and a sleeve 227 freely rotatable about the shaft 29. The sleeve 226 carries integral therewith a driving clutch member, and sleeve 227 carries a driven clutch member. The driving clutch member comprises a pair of oppositely related ratchet wheels 228 and 229 (Fig. 3), the teeth of one being staggered with respect to the other. The driven clutch member comprises a disc 231 integral with the sleeve 227 on which are carried a spring supporting extension 232 and a pawl carrying post 233. A pair of springs 234 and 235 are fixed to the extension 232 and normally tend to move pawls 236 and 237 individual to them in a direction so that the pawl teeth will engage with the teeth of the ratchet wheels 228 and 229. The teeth of the pawl are so related to the ratchet teeth that forward movement of the ratchet is imparted through pawl 236 to sleeve 227, and backlash is prevented by pawl 237. Pawl 236 is also provided with a stop arm 238 which is adapted to cooperate with the stop lever 223. Thus, when the pawl arm 238 strikes the stop arm 223, the pawl 238 rotates or rocks counterclockwise (as viewed in Fig. 3A) about pivot 233 thereby disengaging the tooth of pawl 236 from the ratchet 229. Moreover, the disengagement of pawl 236 in this manner will effect, through a stud 239 (Fig. 3A), the disengagement of pawl 237 from ratchet 228.

Thus, when the stop arm 223 is actuated to free the clutch 225 for a single cycle of rotation, the eccentrics 101 and 102 are operated. The eccentric 101 when operating rocks the shaft 98, and through a toggle connection oscillates bail 88 which, upon its downward movement permits the selectable bars 76 to sense the permutative setting of the vanes 55 to 60. As previously mentioned, the selectable bars 76 are provided with readily removable and interchangeable code elements 83, which facilitates any desirable arrangement of characters. The selectable bar 76 which through its coded elements 83 is permitted to be selected by the vanes drops farther than the remaining bars, to bring its shoulder 119 into engagement with the pull bar 122 if the extremity of bar 76 is not blocked by shoulder 151. Upon the upward movement of bail 88 the selected bar 76 is returned and upon so doing, the pull bar 122 associated therewith is elevated to rock the bar 124 counterclockwise.

At this point it should be mentioned that all of the blocking levers 147 are normally in the vertical position shown in Fig. 5 with the shoulders 151 thereon blocking the selective movement of the bars 76.

The apparatus according to the present invention is adapted to respond to a predetermined sequence of code combinations to operate a contact to perform, or to initiate the performance of, a desired function. For each code combination of the predetermined sequence there is provided a code bar 76, a selection code element 83 cut for the specific code combination, a pull bar 122, an operating lever 124, a latching lever 136 and a blocking lever 147. The blocking lever 147 associated with the first code bar in the predetermined sequence is permanently held out of blocking position by a gate 165 (shown in Fig. 7) so as to permit the selection of the first character of the predetermined sequence. With this exception, each blocking lever 147 is normally positioned so as to block its associated code lever 76 and prevent it from operating. Accordingly, a succeeding blocking lever 147 is moved only when a previous code combination is a correct one in the predetermined sequence, thus conditioning its associated code lever 83 and permitting its operation by the next code combination in the sequence. The operating lever 124 when raised by the pull bar 122 associated therewith becomes latched in its upper position by means of shoulder 143 of said latching lever 136.

Each group of code signals pertaining to a particular way station comprises conditioning codes followed by the station identification letters of the way station from which transmission is desired followed by further conditioning codes. For example, in the system according to the present invention, such a group of code signals will comprise the following codes: "carriage return," "carriage return," "letters," or unshift A, B, C (or other station identification characters), "space" and "letters." Furthermore, the blocking levers 147 are arranged in accordance with this group of code signals and each code lever 83 is identified by its identification plate 86. The gate 165 is inserted, as shown in Fig. 6, to hold the first blocking lever 147 which initiates the predetermined sequence, in its unblocking position. Therefore, when the operating lever 124 associated with said first blocking lever 147 is actuated upwardly, it will move the pin 152 of the second or succeeding blocking lever and operate that blocking lever clockwise to the position shown in Fig. 6. Thus, the second blocking lever is controlled by the cam surface 153 of the first character operating lever 124 of the sequence or of the operating lever associated with the first code bar. After the first code bar is actuated by the first combination of the sequence it will move the blocking lever associated with the second bar out of its blocking position to permit the second code bar to operate should the proper code combination for the second bar be received.

If the second code combination received is the proper one, the second one of code bar 76 in the sequence will move down to latch with its corresponding pull bar 122, and the same operation takes place as was described for the first code combination. That is, the second bar 124 will condition the device for the selection of the third, etc. The subsequent selections of the predetermined sequence proceed in a similar manner. If the sequence of incoming code combinations correspond exactly to the predetermined sequence of code bars, then their associated levers will operate successively to ultimately close certain contacts 161 which control primary station equipment. The bail blade 112 at the proper time in the operating cycle unlatches the bar 124 and latching levers 136 of the preceding selection, thus making the selector code levers 76 responsive to the next code combination of the sequence.

A feature of the selector mechanism according to this invention is its readiness at all times to respond to a predescribed sequence even though preceded immediately by a random incomplete predescribed sequence, by virtue of the fact that the code bar for the first character of the sequence is unblocked by the gate 165 and is always sensing the vanes to start a new sequence. As will be apparent hereinafter a predetermined group of code combinations, herein identified as the "unlock code group" will activate the primary or central controlling equipment in the ordinary manner to start transmission of the actuating codes for the next way station.

Having reference to Fig. 22, a diagram of a loop circuit comprising a central or master control station 501 and a plurality of way stations 502 connected serially by a signal line 503 is shown. There may be 75 or more way stations in the loop circuit. The central station, in addition to the electrical relay arrangement shown in Figs. 16 to 19 is provided with the apparatus disclosed in Figs. 1 to 14, which is identified as 504 in Fig. 22. Also included in the central station circuit are two tape transmitter units 505 and 506 which are of the construction shown in U. S. Patent No. 2,296,845, issued September 29, 1942, to M. T. Goetz. It is significant to note that the transmitter units 505 and 506 are identified in Fig. 19 as transmitter units 256 and 253, respectively. The transmitter unit 506 (253 in Fig. 19) is controlled by the continuous loop of tape, previously described, containing the sequence collection heading and station identification code signals of the series of stations included in the loop circuit. As previously mentioned, this loop of tape need be changed only when a rearrangement of the order in which way station transmission occurs is desired. The auxiliary transmitter 505 (256 in Fig. 19) is not controlled by a tape, but instead (as shown in Fig. 19) the distributor contacts 416 are connected over conductors 419 to the contacts of a set of relays for controlling the date-time signals, and the unlock code signal group. At the way stations 502 the system comprises, in addition to the relay arrangement shown in Fig. 21, the apparatus shown in Figs. 1 to 14 which is identified as 507 in Fig. 22. There is also included in the way station circuit a tape transmitter 508 similar to units 505 and 506.

An operating circuit according to the present invention is shown in Figs. 16 to 19, which figures are arranged as shown in Fig. 20, and the signal line is indicated as extending over conductor 251 through the stop contact 252 (normally closed) of the transmitting unit 253, over conductor 254, through the start-stop contact 255 (normally closed) of the auxiliary transmitter 256, over conductor 257 to junction 258, then over conductor 259, through contact 261 (now closed) of relay 262, over the conductor 263, through the winding of the line relay 264, then over the conductor 265 to the outgoing line. With the line closed there is marking current normally on the line, and the line relay 264 is normally energized to hold its armature 266 normally against the contact 267, thus completing a circuit extending from battery 268, over armature 266, through contact 267, over conductor 269 to junction 271, then over conductor 272, through the winding of the selector magnet 14 (of the sequential control unit shown in Figs. 1 to 4), then over the conductor 273, through contacts 274 of relay 262, to negative battery or ground. Since the relay 262 is unenergized at this time the contact 274 is closed. Since relay 275 is also unenergized at this time its contact 276 is also closed whereby a circuit is completed for the signal lamp 277 and buzzer 278 from positive battery, through the closed contact 276 and over the conductor 279.

With the circuit in the condition just described the operator closes the open line restart key 281, whereupon a circuit is completed for the energization of relay 275 extending from ground, through the winding of the relay 275, to the junction 282, then over conductor 283 to junction 284, over conductor 285, through contact 291 (now momentarily closed), to battery 280. Relay 275 becomes locked up over a locking circuit extending from ground through the winding of relay 275 to junction 282, then through the contact 291 (now closed), over conductor 292 to junction 271, then over conductor 269, through marking contact 267 (still closed) to battery 268. Upon the energization of relay 275 and the opening of contact 276, the open line light 277 is extinguished, and the circuit for the buzzer 278 is also broken. When the relay 275 becomes energized it closes its contact 293 to prepare or condition circuits to be subsequently completed by the operation of contacts 294 and 295 through contact 296.

The next operation consists in operating the sequence start key and closing the contact 295 associated therewith. Upon the closure of contact 295, an energizing circuit for relay 262 is completed from battery 297, through contact 293 (now closed) of relay 275, over conductor 298, through contact 296 (normally closed), over conductor 299 to junction 301, over conductor 302, through contacts 295 (now closed), over conductor 303, through contact 304 (now closed) of relay 305, over conductor 306, and through the winding of relay 262 to negative battery or ground. Relay 262 upon energizing, opens its contact 261 to thereby open the line circuit, whereupon the line relay 264 becomes de-energized and the armature 266 is thereby moved to the spacing contact 307. Upon the closing of contact 307 a circuit for energizing relay 288 is completed from battery 268, over armature 266, through the spacing contact 307 (now closed) of the line relay 264 then over conductor 308, and through the winding of relay 288 to negative battery or ground.

Following the energization of relay 288, an energizing circuit is established for relay 309 extending from positive battery 289, through contact 311 (now closed) of relay 288, over conductor 312, over bridge or tie wire 313, through contact 314 (now closed) of relay 262, over conductor 315 to junction 316, then through the winding of relay 309 to negative battery or ground. A substitute locking circuit for relay 275 is established (the one previously described having been opened at contact 267) the new locking circuit extending from battery 289, through contact 311, over conductor 312, then through contact 317 (now closed) of relay 262, then over conductor 318 to junction 284, then over conductor 283 to junction 282 and thence through the winding of relay 275 to negative battery or ground. Also upon the energization of relay 288 an energizing circuit for relay 373, associated with the counting chain relays, is established from ground or negative battery, through normally closed contact 372 in the auxiliary transmitting unit 256, over conductors 374 and 376, through contact 377, over conductor 379, through the winding of relay 373, through contact 381, over conductor 382, through contact 383 (of relay 394), over conductor 413, then through contacts 385 to 393 and 444 to 447, then over conductor 404 to junction 340, over conductor 320, through strap 313, over conductor 312, and through contact 311 (now closed) of relay 288 to battery 289. Relay 373 becomes locked up over the circuit extending from ground, through contact 372, over conductors 374 and 376, through contact 377 (still closed) of relay 378, over conductor 379, through winding of relay 373, through contact 405 (now closed), then over conductors 404 and 320, over strap 313, over conductor 312, and through contact 311 (still closed), to battery 289. Thus, upon the closing of the start contact 295 the foregoing circuits are established, and the sequential unit 300 is started into operation since the circuit for the selector magnet 14 is broken upon the opening of contacts 274 associated with relay 262 which has just become energized. The sequential unit 300 responds to blank signals, and since the line circuit is broken at contact 261, these signals are not transmitted over the line wire.

The start key 295 is operated only momentarily so that upon the closing of the contact 295 the foregoing circuits have been established, after which the start contact 295 is again opened. The circuit for relay 262 is broken by the opening of contact 295, however relay 262 remains energized for three tenths of a second before de-energizing since it is a slow to release relay. Also when the relay 262 finally de-energizes, its contact 261 closes, whereupon the signal line circuit previously traced is again closed and the line relay 264 is again energized to swing the armature 266 thereof against its marking contact 267, thereby breaking the energizing circuit for relay 288.

Since relay 288 is a slow to release relay it does not release for seventeen hundredths of a second after the spacing contact 307 is opened. Therefore, relay 275 becomes energized from the circuit extending from battery 239, through contact 311 (still closed) of relay 288, over conductor 312, through contact 317 (still closed) of relay 262, over conductors 318 and 283, to junction 282, then through the winding of relay 275 to ground.

Relay 275 then becomes locked up over the circuit extending from battery 268 (associated with the line relay armature 266) through contact 267 of the line relay 264, over conductors 269 and 292, through contacts 291 (now closed) to junction 282 and then through the winding of relay 275 to ground. This locking circuit takes effect before the relay 288 releases. The opening of contact 311 of relay 288 breaks the original energizing circuit for relay 309 which in the meantime has become locked up over the circuit extending from ground, through the winding of relay 309 to junction 316, over conductor 321, through closed contact 322 of the unit 300, over conductor 323, through contact 324 (still closed) of relay 309, over strap 325, over conductors 326 and 327, through closed contact 328 of unit 300, over conductors 329 and 331 to junction 332, over conductors 333 and 299, through contact 296 (normally closed), over conductor 298 and through contact 293 (still closed) of relay 275 to positive battery 297. When relay 288 de-energizes, it closes its contact 319 to establish an energizing circuit for the counting chain relay 394 extending from ground or negative battery, through contact 319, over conductor 330, through contact 409, over conductor 411, through winding of relay 394, over conductors 412 and 413, through contact 385, over conductor 434, through contacts 386 to 393 successively, over conductor 404 and through contact 419 to battery 420.

A circuit for energizing the relay 334 is also established, upon de-energization of relay 288, from battery 289, through contact 287 (closed during the period of release of relay 288), then over conductor 322, through contact 335 (now closed) of relay 309, over conductor 336 to junction 337, over conductors 338 and 339 and through the winding of relay 334 to negative battery or ground. Relay 334 locks up immediately, over a circuit extending from ground, through the winding of relay 334, over conductor 339 and through contact 341 (now closed) of relay 334, over conductor 342, through contact 343 of the unit 300, over conductor 344, through contact 345 (now closed) of relay 309, over conductors 326 and 327, through contact 328 of the unit 300, over conductors 329 and 331, to junction 332, over conductors 333 and 299, through contact 296 associated with the stop key then over conductor 298 and through contact 293 (now closed) of relay 275 to positive battery 297.

Relay 305 now becomes energized over a circuit extending from ground, through the winding of relay 305 to junction 346, over conductor 347, through contact 348 (now closed) since the relay 262 has become de-energized at the expiration of the three tenths second period, then over conductor 349, through contact 351 (now closed) of relay 309, over conductors 352, 331, 333 and 299, through contact 296, over conductor 298 and through contact 293 (still closed) to battery 297. Relay 305 becomes locked up over a locking circuit extending from ground through the winding of relay 305 to junction 346, then over conductor 352 to junction 353, through contact 354 (now closed) of relay 305 to junction 355, over conductor 327, through contact 328 of unit 300, then over conductors 329, 331, 333, and 299, through contact 296 (normally closed), then over conductor 298 and through contact 293 (still closed) of relay 275 to battery 297.

With the circuit arrangement shown in Figs. 16 to 19 conditioned as just described, a circuit is completed for the start or control magnet 356 of the transmitting unit 253, which extends from current source 357 (associated with relay 334), through contact 358 (now closed) of relay 334, over conductor 359, through contact 361 (now closed) of relay 309, over conductor 362, through contact 363 of the sequential control unit 300, over conductor 364 and through the winding of magnet 356 to ground.

As previously described, the unit 253 begins to transmit a message from a perforated tape that has been previously inserted in the unit. This tape, as previously mentioned, is perforated with a group of code signals called a sequence collection heading which precedes each hourly weather sequence collection, for example, the code signals are as follows: "letters" code, station identification (call letters of the central or master control station), carriage return code, 10 "line feed" code signals, S and C character codes (signifying "sequence collection"), space signal, "circuit of origin" number, space, "date-time" group codes, "letters," "carriage return," and "line feed." As described hereinafter, the unit 253 transmits the codes in the tape up to the point where the "date-time" group of codes should appear, which codes are then transmitted, after the unit 253 is momentarily stopped, through the auxiliary transmitting unit 256 under the control of the counting relays.

Under the control of the perforations of the tape inserted in the unit 253, the contact 363 in the unit 300 opens in response to a "space" signal, and the contact 365 closes and the circuit is established for the start or control magnet of the transmitting unit 256 extending from current source 357 (associated with relay 334), through contact 358 (still closed) of relay 334, over conductor 359, through contact 361 (still closed) of relay 309, over conductor 362, over strap 366, through contact 365 (now closed), over conductor 367 to junction 368, then over conductor 369 and through the winding of start magnet 371 of the auxiliary unit 256 to current source. The transmitting unit 256 is now in readiness to transmit the code pertaining to the date and time of sequence collection under the control of the chain relays 394 to 403.

As previously described, the energizing circuits for the control relay 373 and the first counting relay 394 are already established and these relays are locked up preparatory to the transmission of the "date-time" group of signals under the control of the auxiliary transmitter 256. Contact 372 of unit 256 is normally closed and is opened momentarily once during each cycle of operation of transmitting contacts 255 and 416 for the purpose of stepping the control along the counting relays 394 to 403 and 440 to 443. The previously described locking circuits for relays 373 and 394 remain effective as long as the auxiliary contact 372 of the unit 256 remains closed.

With the counting chain relay 394 operated, the first code combination of the date-time group is transmitted through the auxiliary transmitting contacts 416 of the auxiliary transmitting unit 256, the transmitting contacts 417 of the counting chain relay 394 being closed. It is understood that the circuits through the transmitting contacts 416 and the counting chain contacts 417 are governed permutably by the setting of the switch 418 associated with the counting chain relay 394. The complete internal connections of only the switch 418 is shown. However, it should be understood that switches 438, 448, 458, 468 and 470 are similar to and are connected the same as switch 418. For example, in the position shown, the switch arms (of which there are in the present instance one arm 449 for indexing and arms 451 to 455 for establishing electrical connections according to the impulses in the code) are set for transmitting the code for the numeral "1," the code for which is 1—2—3—5 marking. By way of example, the circuit through the transmitter 256 and switch 418 extends from one side of the line, over conductor 251, through stop contact 252 (normally closed) of transmitter 253, over conductor 254, through contacts 255 and 416 (as they are sequentially operated) of transmitter unit 256, then over conductors 419, through contacts 417 (now closed) of relay 394, through the contacts of switch 418 in register with switch arms 451 to 455, over conductor 421 to junction 258, then over conductor 259, through contact 261, over conductor 263, through the winding of line relay 264, and over line wire 265.

Contact 372 opens cyclically, and following the transmission of the first character of the date-time group under the control of relay 394 of the counting chain, as above described, the contact 372 is again opened momentarily to first break the locking circuit for relay 373 and then upon reclosing to establish an energizing circuit for relay 378 extending from ground or negative battery, through contact 372 (now reclosed), over conductor 374 to junction 375, then through contact 422 (now closed) of relay 373 (which has become de-energized due to the cyclic opening of contact 372 to break the locking circuit for relay 373), over conductor 423, through the winding of relay 378, over conductor 424, through contact 425 of the make-before-break contact, over conductor 426, through contact 427 (now closed) of relay 394 (still energized), over conductor 413, through contacts 385 to 393 and 444 to 447, over conductor 404, through contact 410 of relay 334 (still closed) to battery 420. Relay 378 becomes locked up over the following locking circuit: From ground or negative battery, through contact 372, over conductor 374 to junction 375, through contact 422 (still closed), over conductor 423, through the winding of relay 378, over conductor 424, through make-before-break contact 430, then over conductor 404 and through contact 410 to battery 420.

The energization of relay 378 causes the closing of contact 428 to complete an energizing circuit for counting relay 395 from negative battery through contact 428, over conductor 429, through contact 431 (still closed) of relay 394, over conductor 432, through the winding of relay 395, over conductors 433 and 434, then through contacts 386 to 393 and 444 to 447, over conductor 404 and through contact 410 (still closed) of relay 334 to battery 420. The counting chain relay 395 is locked up over a locking circuit extending to its own contact 435 by substituting ground 436 for the ground previously described as associated with contact 428 of relay 378. Relay 394 becomes de-energized due to the opening of contact 385.

With the counting chain relay 395 operated, the second code combination of the date-time group is transmitted through the transmitting contacts 416 of the auxiliary transmitting unit 256, the transmitting contacts 437 of the counting chain relay 395 being closed. The circuits through the transmitting contacts 416 and the counting chain contacts 437 are, of course, governed permutably by the setting of the switch 438 associated with the counting chain relay 395. The circuit through the transmitter 256 and switch 438 extends from side 251 of the line to the side 265 thereof, as previously described in connection with the transmission of the first character under control of counting chain relay 394.

At the conclusion of the cycle wherein the second character is transmitted under control of relay 395, the contact 372 will again be momentarily opened to break the locking circuit for relay 378 to prepare the circuit again for relay 373, extending from negative battery through contact 372 (now closed), over conductors 374 and 376, through contact 377 (now closed) of relay 378, over conductor 379, through the winding of relay 373, through contact 381 (now closed), over conductors 382 and 456, through contact 457 (still closed) of relay 395, over conductor 434, through contacts 386 to 393 and 444 to 447, over conductor 404 and through contact 410 (still closed) to battery 420.

The energization of relay 373 causes the closing of contact 406 to complete an energizing circuit for counting relay 396 from negative battery, through contact 406, over conductor 407, through contact 458 (now closed), over conductor 459, through the winding of relay 396, over conductors 461 and 462, then through contacts 387 to 393 and 444 to 447, over conductor 404 and through contact 410 (still closed) of relay 334 to battery 420. The counting relay 396 is locked up over a locking circuit extending to its own contact 463 by substituting ground 464 for the ground previously described as associated with contact 406 of relay 373. Relay 395 becomes de-energized due to the opening of contact 386.

With the counting chain relay 396 operated, the third code combination of the date-time group is transmitted through transmitting contacts 416 of the auxiliary transmitting unit 256, the contacts 465 of relay 396 being closed. As previously described, the circuits through the transmitting contacts 416 and the contacts 465 are governed permutably by the setting of switch 448. The circuit through the transmitter 256 and switch 448 extends from side 251 of the line to the side 265 thereof, as previously described in connection with the transmission of the first and second characters under control of counting chain relays 394 and 395.

Again, at the conclusion of the cycle wherein the third character is transmitted under the control of relay 396, the contact 372 will be momentarily opened to break the locking circuit for relay 373 to prepare the circuit again for relay 378. When relay 378 energizes, its contact 428 closes to complete a circuit for the next counting chain relay 397 through contact 466 (still closed) of relay 396 and terminating at battery 420. Then, when relay 397 energizes, its contact 467 closes to substitute the negative battery or ground 468 for ground associated with contact 428. The fourth code combination of the date-time group is then transmitted through contacts 469 and the permuted setting of contacts in the switch 458.

When the contact 372 again opens and closes, the circuit for control relay 378 is opened and the circuit for control relay 373 is established. Then, when relay 373 energizes, its contact 406 closes to complete a circuit for counting chain relay 398 through contact 471 (still closed) of relay 397 to ground 420. Relay 398 then energizes and closes its contact 472 to substitute negative battery or ground 473 for ground associated with contact 406. The opening of contact 388 of relay 398 breaks the circuit for relay 397. The closing of contacts 474 of relay 398 prepares the circuit for the transmission of the fifth code combination of the date-time group under the control of switch 468 and transmitting contacts 416.

The next momentary opening and closing of contact 372 will effect the de-energization of relay 373 and energize relay 378, whereupon, relay 399 will become energized (and relay 398 de-energized) to effect the transmission of the sixth code combination of the date-time group under the control of switch 470 and transmitting contacts 416.

When the contact 372 opens and closes on the next cycle, relay 378 will de-energize and relay 373 will energize, whereupon, relay 400 will become energized (and relay 399 will de-energize) to effect the transmission of the seventh code combination of the date-time group under the control of transmitting contacts 416. It will be noted that no switch (similar to switch 418) is associated with relay 400, but instead a fixed code signal (namely the "letters" code combination) is transmitted under the control of relay 400.

The opening and closing of contact 372 during the next cycle will effect the de-energization of relay 373 and the energization of relay 378 so that relay 401 will become energized (and relay 400 will de-energize) to effect transmission of the eighth code combination of the date-time group under the control of switch 469 and transmitting contacts 416.

The next opening and closing of contact 372 will cause relay 378 to de-energize and relay 373 to energize, thus causing counting chain relay 401 to become energized (relay 402 thereby de-energizing) to effect transmission of the ninth code combination of the date-time group, which in the present embodiment is fixed and represents the carriage return signal. This carriage return signal, like all other signals, is transmitted over the line exemplified by conductors 251 and 265 and, of course, is also impressed on the line relay 264, so that the selector magnet 14 of the control unit 300 is responsive thereto. The reception of the carriage return signal by unit 300 will effect the opening of contact 365 which is included in the previously described energizing circuit for start magnet 371 of the auxiliary transmitting unit 256. Thus, the opening of contact 365 causes the unit 256 to cease operating. However, during the last cycle of operation of unit 256, the contact 372 is again opened and closed so that relay 373 again de-energizes and relay 378 energizes (relay 402 de-energizing) to effect transmission of the tenth code combination of the date-time group, which is the line feed signal.

The reception of this line feed signal by unit 300 will effect the closing of contact 363 to re-establish the circuit for the start magnet 356 to cause unit 253 to continue transmission. During this continuance of transmission from unit 253 the station call signal group combinations are transmitted, the effect of which is to condition and call in the way station identified with the particular call letters, as will hereinafter appear.

After the station call letters have been transmitted, a "space" signal is impressed on the line, the effect of which is to open contact 343 in the control unit 300 whereupon relay 334 will become de-energized thereby releasing its contacts 341, 358 and 410. The opening of contact 358 breaks the circuit for the start magnet 356 in the transmitting unit 253 (it being noted that contact 363 of unit 300 was previously closed in response to a line feed signal) thereby stopping transmission from unit 253.

Following this "space" signal, a "letters" signal is impressed on the signal line during the last cycle of operation of unit 253 following the de-energization of magnet 356, the effect of which is to open contact 322 in the control unit 300 to break the energizing circuit for relay 309. The master control station circuit shown in Figs. 16 to 19 is now conditioned for the reception of the message to be transmitted from the first way station to be called in, which way station is exemplified by the circuit shown in Fig. 21. Under this condition of operation, the control relays 275, 288, and 305 at the master station remain energized, and the remainder of the relays are de-energized.

Having reference to Fig. 21, the signal line 251—265 is looped through the selector magnet 475 (comparable to selector magnet 14 of unit 300 at the central station) of the control unit 476, the stop contact 477 of the transmitting contacts 478 of transmitter 479 and through a line relay 526. As previously described, the conditioning code signals; namely, carriage return, carriage return, "letters," A, B, C (station identification), "space" affect the selector magnet 475 to select the bars 76 sequentially to operate a contact 161. Prior to the reception by the way station of the conditioning code signals just described, the keys 431 and 500 are depressed momentarily at the hour when it has been predetermined that weather information collection shall proceed. Since the normal condition of the signal line 251—265 is marking current on the line, a circuit for relay 520 (which is of the slow-to-release type) will be completed upon the momentary closure of contact 500, extending from battery, through armature 527 of line relay 526, through marking contact 528, over conductor 531, through the winding of relay 520 and through contact 500 (now momentarily closed) to ground. Upon energization of relay 520, its contact 532 will open, and its contacts 494, 510, 533 and 577 will close. The closing of contact 533 completes a locking circuit for relay 520 extending from ground, through contact 533, then through the winding of relay 520, over conductor 531, through contact 528 and over armature 527 to battery. After this locking circuit is established, the key 500 may be released or opened. Since relay 520 is of the slow-to-release type, the normal oscillations of the line relay armature 527, causing the rapid opening and closing of contact 528 will have no effect upon the relay 520 and accordingly contact 532 will remain opened and contacts 510, 533 and 577 will remain closed until a prolonged opening of relay contact 528 occurs, due to an open line condition. It was further described hereinbefore, that at each way station, a tape had been previously prepared containing the weather or other information, which tape has been inserted in the transmitter 479, and shortly before the appointed time when sequential collection is to begin, the key 481 is operated to close contacts 482 and 483 to establish a circuit from battery 484, through contacts 482 and 483 of key 481, over conductor 485, and through the winding of relay 486 to ground.

As relay 486 becomes energized, it pulls up its armatures to open its contacts 489 and 487, and to close contacts 488, 489, 490, 491 and 578. Relay 486 becomes locked up over a circuit extending from ground through the winding of relay 486, then through contact 488 (now closed), over conductor 492, through contact 493 (now closed), through contact 494 (now closed) of relay 520, through normally closed key 495 to battery 496. The function of key 495 is to de-energize relay 486 should it be desired to revert from automatic to manual operation. Following the operation of relay 486, the lamp 497 will become illuminated to evidence the automatic condition of the way station apparatus preparatory to sequential collection of information. The circuit for lamp 497 extends from battery 484, through lamp 497, through contact 490 (now closed), to ground. The closing of contact 491 establishes an obvious circuit for motor 498 of the unit 476. The closing of contact 578 prepares a circuit for relay 516. Such is the waiting condition of the system at the way station.

Now, when sequential collection has started and the previously indicated conditioning code signals are transmitted, the selector magnet 475 will control the mechanism shown in Figs. 1 to 14 in the manner previously described, to select successively the bars 76 to operate the contact 161 of the particular way station selected. With contact 161 closed, a circuit is established from battery 499, through contact 161, through contact 489 (now closed), over conductor 511 then through the winding of relay 512 to ground. Relay 512 upon energizing closes its contacts 513, 522, and 523. A locking circuit for relay 512 is completed from ground, through the winding of relay 512, through contact 513 (now closed), over conductor 514, through contact 161 to battery 499.

Simultaneously, a circuit is completed for relay 516 extending from battery 499, through contact 161, then through contacts 578 (now closed) of relay 486, through contact 577 (now closed) of relay 520, then through the winding of relay 516 to ground. Relay 516 upon energizing closes its contacts 518, 519, and 579, and opens its contacts 493 and 521. The opening of contact 493 breaks the locking circuit for relay 486. The lamp 497 remains illuminated even when relay 486 is de-energized because of the ground at closed contact 518. The originally described power circuit for motor 498 through contact 491 of relay 486 is broken when relay 486 de-energizes, but in the meantime the contact 523 (now closed) of relay 512 has become substituted for contact 491 to maintain a second obvious power circuit for motor 498.

Upon the closure of contact 519 of relay 516, a circuit is established for energizing the clutch magnet 524 of the tape transmitter 479 over an obvious circuit. As previously mentioned, the tape containing the weather (or other) information has been inserted in the transmitter 479, so that upon the conditioning of the way station equipment exemplified by Fig. 21, the message will be transmitted from the way station to the master control station. The receiving printer at the master control station is exemplified by the numeric 525.

In the event that the signal line is opened during message transmission for some reason, the circuit at the way station is provided with facilities which compensate for this condition. It will be recalled that during message transmission from the way station, the relays 512, 516 and 520 (Fig. 21) are energized and the relay 486 is de-energized and accordingly, contacts 480 and 522 in the circuit for the open line lamp 534 are closed, while the contact 532 in said circuit is open, whereby the lamp 534 is not illuminated. However, should an open line condition occur, the marking contact 528 will open so that the previously described locking circuit for the relay 520 will be broken, whereupon contact 532 will close and contacts 510, 533 and 577 will open. The circuit for the open line lamp 534 will be established and the lamp will illuminate to indicate that an open line condition exists. The opening of contact 510 causes the relay 516 to de-energize, thus allowing contact 519 to open to cause the start magnet 524 to de-energize to thereby stop transmission from the way station. The opening of contact 518 of relay 516 causes lamp 497 to be extinguished, and the closing of contact 521 permits lamp 535 to be illuminated, indicative of the manual condition of the way station, as distinguished from the automatic condition previously described. The closing of contact 532 of relay 520 will cause lamp 534 to become illuminated, since contacts 522 and 480 are still closed. It is observed that so long as the open line condition is present, the relay 486 may be energized by depressing key 481, but its locking circuit is open at contact 494 of relay 520 and consequently relay 486 remains energized only during depression of key 481. To restart transmission after the open line condition has been remedied, the following operations take place. The key 500 is again closed momentarily to effect the energization of relay 520 in the same manner as previously described, to thereby open contact 532 to extinguish lamp 534, and to close contacts 510 and 577. Then the key 481 is again operated to effect the energization of relay 486. The closing of contact 578 of relay 486 completes the energizing circuit for relay 516 because the contact 161 is still closed, and contact 577 has just been closed as a result of operating key 500. Relay 516 again becomes locked up through its contact 579 and contact 510 (now closed) of relay 520. Relay 516 closes contact 519 to again initiate operation of the tape transmitter 479 by energizing magnet 524.

At the conclusion of message transmission at the way station (exemplified by Fig. 21), an end-of-message (or unlock code, so-called because it unlocks the master control circuit, to resume transmission thereat to select the next way station in the sequence) signal is transmitted comprising the following code signal combinations: "line feed," "figures," "carriage return" and "letters." These code signals are perforated in the tape following the regular message, and are impressed on the line to perform a dual function. First, as the signals pass through the selector magnet 475 of the unit 476 at the way station, the previously operated contact 161 is opened, the effect of which is to restore the way station circuit and apparatus to normal. In this process, the locking circuits for relays 512 and 516 are broken, thereby breaking the circuits for magnet 524 and the motor 498. Also, the lamp 497 extinguished, and the lamp 535 is illuminated over the circuit extending from battery 496, through lamp 535, through contact 521 (now closed), through contact 487 (now closed) to ground.

Secondly, the end-of-message (or unlock) code signals will affect the circuit at the master control station (Figs. 16 to 19) in the following manner. It will be recalled that relays 288, 275, and 305 are still energized. In response to the sequence of codes combinations comprising the unlock code, the contact 536 in the unit 300 (Fig. 18) is closed to complete an energizing circuit for the start magnet 356 of the transmitter 253 extending from battery 537 (associated with relay 305), through contact 539 (still closed) of relay 305, over conductor 541, through contact 542 (still closed) of relay 275, over conductor 543, through contact 536 (now closed) of unit 300, over strap 544, then over conductor 364 and through the winding of start magnet 356 of transmitter 253.

Thus, it is observed that in response to the end-of-message (or unlock) code signal group, the central or master control station is activated to thereby transmit the conditioning and station identification code signal combinations to the next desired way station to be called in or selected. It will also be recalled that the order or sequence in which the way stations are called in is contained in a continuous loop of perforated tape. As the transmitter 253 is thus operated, the relays in Fig. 21, are actuated in the order and manner previously described.

In the event that the selected or called way station fails to respond to the call of the master control station, or in case the way station just terminating its message transmission fails to send an end-of-message (or unlock) group of signals, provision is made for both these eventualities by providing in the circuit arrangement shown in Figs. 16 to 19 certain additional relays. A prerequisite to the activation of the master control station circuit in both of these eventualities is the presence of a time delay of three seconds, wherein the signal line remains in a marking condition so that relay 569, which is a slow-to-operate relay, will be given time to operate, or the way station will be given time to respond.

After the lapse of a one hundred seventy millisecond interval the relay 288 will become de-energized because of the opening of spacing contact 307 of line relay 264, and accordingly, contact 568 of relay 288 will close to complete an energizing circuit for relay 569 extending from battery 537 associated with relay 305, through contact 571 (still closed) of relay 305, over conductor 572, through contact 568 (now closed) of relay 288, over conductor 573, and through the winding of relay 569 to negative battery or ground. The relay 569, being of the slow-to-operate type, is set to operate after a three second interval, after which it pulls up its armature to close its contact 574 to complete a circuit for relay 334 extending from battery 575, through contact 574, over conductors 576, 338 and 339, through the winding of relay 334 to negative battery or ground. The operation of relay 334 effects the closing of its contacts 341, 358, and 410.

Upon the closing of contact 410 a circuit for the counting chain relay 440 is completed from battery 420, through contact 410, over conductor 404, through contacts 447, 446, 445, and 444, over conductor 549, through the winding of relay 440, over conductor 551, through contact 552 (now closed), over conductor 330, through contact 319 (now closed) of relay 288 to negative battery or ground 553. Relay 440, upon energizing, closes its contact 554 to complete a locking circuit for this relay by substituting ground 555 for ground 553.

Relays 440, 441, 442, and 443 control the transmission of the unlock code signal group which in the present embodiment is a group of signals comprising the "line feed," "figures," "carriage return," and "letters" code combinations. The transmitting contacts 556, 557, 558, and 559, respectively, of these relays are accordingly strapped to agree with said codes so that after the three-second delay, the counting chain relays 440, 441, 442, and 443 are activated sequentially to supply the unlock code group, the function of which was previously described. As just described, then, the relay 440 is conditioned preparatory to sending the first code of the unlock code group.

Upon the closing simultaneously of contact 358, a circuit for the energization of clutch magnet 371 of transmitter 256 is completed from battery 357, through contact 358 (again closed) of relay 334, over conductor 359, through contact 547 (now closed) of relay 309, over conductors 548 and 369, and through the winding of magnet 371 to ground. The operation of magnet 371 initiates rotation of the transmitting shaft (not shown) in transmitter 256 to effect the sequential closing of contacts 416 and the cyclical opening of contact 372. As previously described, the closing of contacts 416 sequentially causes the transmission of the first code combination of the unlock group of code signals under the control of contacts 556 of relay 440. Following the sequential closing of contacts 416 and just before completion of the cycle of rotation of the transmitting shaft, the contact 372 will momentarily be opened to break the circuit for relay 373, and upon again closing, the circuit for relay 378 will be completed through contact 422 of relay 373 and contact 561 of relay 440 to battery 420.

Relay 378 upon energizing closes its contact 428 to effect the operation of the next counting relay 441 through contact 562 (now closed) of relay 440. Relay 441 upon energization, locks up through its contact 563, and by opening its contact 445 it breaks the previously established locking circuit for relay 440. Contacts 557 of relay 441 being now closed, the code combination for the second signal of the unlock group of signals will be transmitted through contact 416 of the transmitter 256. Then, upon the next cyclic opening of contact 372 the relay 378 will be de-energized and when contact 372 again closes after being opened momentarily, relay 373 will be energized to close contact 406 to effect the energization of relay 442 and the de-energization of relay 441. Then, upon the next closing of contact 372 the relay 443 will be energized, whereupon the last code signal of the unlock group of codes will be transmitted to effect the closing of contact 536 in the unit 300 to complete the afore-described energizing circuit for the clutch magnet 356 of the transmitting unit 253.

The transmission of the "carriage return" signal of the unlock code group (under the control of relay 442) had the effect of opening the contact 563 in the unit 300 to break the locking circuit for relay 334 which extended from negative battery or ground, through the winding of relay 334, over conductor 339, through the locking contact 341 of relay 334, over conductor 342, over strap 564, through contact 563 of unit 300, over conductor 565, through contact 566 (now closed) of relay 309, over conductors 326 and 327, through contact 328 of unit 300, over conductors 329, 331, 333 and 299, through contact 296 (still closed), over conductor 298, and through contact 293 (still closed) of relay 275 to battery. The deenergization of relay 334 causes its contacts 341, 358, and 410 to open. The opening of contact 358 breaks the circuit for clutch magnet 371 of the transmitting unit 256 which stops operating. However, the transmitting shaft of the auxiliary transmitter 256 completes another rotation, the effect of which is to transmit the "letters" code signal set up in relay 443 which functions to start the tape transmitter 253 by closing contact 536 of unit 300. The opening of contact 410 removes battery from the counting relays, and the opening of locking contact 341 assures the de-energization of relay 334 after contact 563 is again closed.

Upon the operation of transmitting unit 253 transmission will be continued from the perforated tape containing the perforated code signals of the way stations to be selected. Thus, despite the fact that a called way station has failed to answer, it is observed that facilities are provided for passing up this station and automatically resuming the station call function.

After all of the way stations in the loop circuit have been selected and their respective messages transmitted to the master control station transmitter 253 and recorded on the printer 525, a "shutdown" signal (perforated in the loop of tape in unit 253) will be transmitted, the effect of which will now be described. The "shutdown" group of signals, according to the present embodiment of the invention comprises the "figures," "figures," and "letters" code signal combinations. After the end-of-message or "unlock" group of code signals from the last way station to be called in has been received and the tape transmitter 253 has been initiated into operation in response thereto, the "figures," "figures" codes of the "shutdown" group of codes will, when transmitted, have the effect of sequentially selecting a group of selector bars 76 in the unit 300, the last bar 76 in the sequence operating to open the contact 328 of unit 300, the effect of which is to break the circuit for relay 305 which by opening its contact 539 breaks the circuit for clutch magnet 356 of unit 253, previously described as extending through contact 539 of relay 305, and contact 536 (still closed) of unit 300. Incidentally, as a result of the next sequence collection all contacts in unit 300 are brought back to normal condition.

In this condition, all of the relays shown in Figs. 16 to 19 will be de-energized except relay 275 which, because it is of the slow-to-release type, will remain energized not only while the armature 266 is vibrating in response to code signals, but also when marking current is impressed on the line during nonsignaling intervals.

Although a specific embodiment of the invention has been shown in the drawings and described in the accompanying specification, it is understood that this invention is not limited thereto, but is capable of modification and rearrangement without departing from the spirit or scope of the appended claims.

What is claimed is:

1. In a telegraph system, a primary station, a plurality of secondary stations serially connected with said primary station and with each other, a first means at said primary station to transmit call-in signals in a predetermined order to all of said secondary stations, a series of switches settable according to a predetermined kind of information, a counting relay chain associated with said series of switches, an auxiliary transmitter at said primary station effective under the control of said first means to control said counting relays to automatically insert said predetermined kind of information, means controlled by said auxiliary transmitter effective to automatically reinitiate retransmission from said first means, and means at each of said secondary stations effective to condition the particular secondary stations to render only one of said secondary stations operative on receipt of its call-in signal and said inserted signals after being conditioned.

2. In a printing telegraph system, a primary station, line reading relays at said primary station, control relays associated with said line reading relays, a first transmitter, an auxiliary transmitter, an initiating key, a signal responsive unit at said primary station comprising selectively operable contacts for cooperating with said relays, whereby in response to the actuation of the initiating key the line reading relays are activated to effect through said control relays message transmission from said first transmitter, a series of switches settable according to a predetermined kind of information, a counting relay chain associated with said series of switches, means in said unit effective in response to predetermined signaling conditions for stopping transmission from said first transmitter and for automatically starting transmission from said auxiliary transmitter, cyclically actuated means in said auxiliary transmitter for operating said counting relay chain to insert said predetermined kind of information as determined by said switches, and means responsive to other signaling conditions for resuming transmission from said first transmitter.

3. In a printing telegraph system, a primary station, a plurality of secondary stations serially connected therewith, line reading relays at said primary station, control relays associated with said line reading relays, said primary station comprising a first transmitter, an auxiliary transmitter, an initiating key, a signal responsive unit containing selectively operable contacts for cooperating with said relays, whereby in response to the actuation of the initiating key the line reading relays are activated to effect through said control relays message transmission from said first transmitter, a series of switches settable according to a predetermined kind of information, a counting relay chain associated with said series of switches, means in said unit effective in response to predetermined signaling conditions for stopping transmission from said first transmitter and for automatically starting transmission from said auxiliary transmitter, cyclically actuated means in said auxiliary transmitter for operating said counting relay chain to insert said predetermined kind of information as determined by said switches, means responsive to other signaling conditions for resuming transmission from said first transmitter, means at said secondary stations to condition the secondary station for selective response to said primary station, and means at each of said secondary stations responsive to groups of signals transmitted from said primary station to read said transmitted signals to effectuate the response of said secondary station for transmission according to the group identified therewith.

4. In a printing telegraph system, a primary station, a plurality of secondary stations serially connected therewith, line reading relays at said primary station, control relays associated with said line reading relays, said primary station comprising a first transmitter, an auxiliary transmitter, an initiating key, a signal responsive unit containing selectively operable contacts for cooperating with said relays, whereby in response to the actuation of the initiating key the line reading relays are activated to effect through said control relays message transmission from said first transmitter, a series of switches settable according to a predetermined kind of information, a counting relay chain associated with said series of switches, means in said unit effective in response to predetermined signaling conditions for stopping transmission from said first transmitter and for automatically starting transmission from said auxiliary transmitter, cyclically actuated means in said auxiliary transmitter for operating said counting relay chain to insert said predetermined kind of information as determined by said switches, means responsive to other signaling conditions for resuming transmission from said first transmitter, means at said secondary stations to condition the secondary station for selective response to said primary station, and a further relay chain at said primary station independent of said series of switches effective upon the non-responsiveness of the selected one of said secondary stations to automatically reinitiate transmission from said first transmitter to select the succeeding secondary station for operation.

5. In a printing telegraph system, a signal line, a central station and a plurality of way stations connected in said line, an initiating key at said central station, control relays effective upon the operation of said initiating key to effect a predetermined opening of said line to condition said system for sequential selection of said way station, said central station comprising a first transmitter, an auxiliary transmitter and a mechanical selector means, said selector means including selectable instrumentalities for cooperating with said control relays, whereby in response to the actuation of said initiating key said control relays are activated to effect, through said selectable instrumentalities, message transmission from said first transmitter, means comprising a series of settable switches and a counting relay chain associated therewith for storing a predetermined kind of information, certain of said selectable instrumentalities effective in response to predetermined signaling conditions for arresting transmission from said first transmitter and for automatically initiating transmission from said auxiliary transmitter, cyclically operated means in said auxiliary transmitter for operating said counting relay chain to insert, through said auxiliary transmitter, said predetermined kind of information under control of said counting relay chain.

6. In a telegraph system, a primary station, a plurality of secondary stations serially connected with said primary station and with each other, a first transmitting means at said primary station to transmit call-in signals in a predetermined order to all of said secondary stations, an auxiliary transmitting means at said primary station, message storage means at said primary station comprising a series of settable switches and a counting relay chain associated therewith for storing a predetermined kind of information, a mechanical selector means in said primary station comprising selectable instrumentalities, means in said mechanical selector means responsive to predetermined signaling conditions to operate certain of said instrumentalities for initiating operation of said auxiliary transmitter, cyclically actuated means in said auxiliary transmitter for operating said counting relay chain to automatically insert, through said auxiliary transmitter, said predetermined kind of information under control of said counting relay chain, and further selectable instrumentalities in said mechanical selector means responsive to other predetermined signaling conditions under control of said counting relay chain for restarting said first transmitting means.

7. In a telegraph system, a primary station, a plurality of secondary stations serially connected with said primary station and with each other, a first transmitting means at said primary station to transmit call-in signals in a predetermined order to all of said secondary stations, an auxiliary transmitting means at said primary station, message storage means at said primary station comprising a series of switches settable according to a predetermined kind of information and a counting relay chain, a mechanical selector means in said primary station comprising selectable instrumentalities, means in said mechanical selector means responsive to predetermined signaling conditions to operate certain of said instrumentalities for initiating operation of said auxiliary transmitter, cyclically actuated means in said auxiliary transmitter for operating said counting relay chain to automatically insert, through said auxiliary transmitter, said predetermined kind of information under control of said counting relay chain.

GEORGE G. KEYES.

REFERENCES CITED

The following references are of record in the file of this patent:

UNITED STATES PATENTS

| Number | Name | Date |
|---|---|---|
| 2,357,397 | Wack et al. | Sept. 5, 1944 |
| 2,412,198 | Bacon | Dec. 10, 1946 |
| 2,430,447 | Branson et al. | Nov. 11, 1947 |

Certificate of Correction

Patent No. 2,502,654　　　　　　　　　　　　　　　　　　　　　April 4, 1950

GEORGE G. KEYES

It is hereby certified that errors appear in the printed specification of the above numbered patent requiring correction as follows:

Column 1, line 33, for the word "of", first occurrence, read *or*; column 21, line 46, for the numeral "401" read *402*; same line, for "relay 402" read *relay 401*;

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*